(12) United States Patent
Wu et al.

(10) Patent No.: US 10,555,138 B1
(45) Date of Patent: *Feb. 4, 2020

(54) SIMPLIFIED MESSAGE GROUPING AND DISPLAY

(71) Applicant: Snap Inc., Venice, CA (US)

(72) Inventors: William Wu, Marina del Rey, CA (US); Michael Brian Murray, Marina Del Rey, CA (US); Chamal Samaranayake, Venice, CA (US); Erik Wagner, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,415

(22) Filed: Jan. 26, 2018

Related U.S. Application Data

(63) Continuation of application No. 14/969,841, filed on Dec. 15, 2015, now Pat. No. 9,913,114.

(51) Int. Cl.
| | |
|---|---|
| *H04W 4/14* | (2009.01) |
| *H04L 12/58* | (2006.01) |
| *G06F 17/21* | (2006.01) |
| *G06T 11/60* | (2006.01) |
| *G06T 13/80* | (2011.01) |

(52) U.S. Cl.
CPC .......... *H04W 4/14* (2013.01); *G06F 17/212* (2013.01); *G06F 17/214* (2013.01); *G06T 11/60* (2013.01); *G06T 13/80* (2013.01); *H04L 51/16* (2013.01)

(58) Field of Classification Search
CPC ...... H04W 4/14; G06F 17/212; G06F 17/214; G06T 11/60; G06T 13/80; H04L 51/16
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |

(Continued)

FOREIGN PATENT DOCUMENTS

CA    2887596 A1    7/2015

OTHER PUBLICATIONS

"U.S. Appl. No. 14/969,841, Final Office Action dated Jun. 30, 2017", 9 pgs.

(Continued)

*Primary Examiner* — Marcus Hammonds
(74) *Attorney, Agent, or Firm* — Schwegman Lundberg & Woessner, P.A.

(57) ABSTRACT

Systems and methods for simplified message grouping and display are provided. In example embodiments, a plurality of messages are received within a conversation which is accessible by a plurality of client devices. Messages are grouped into different cards based on criteria associated with the cards. During a transition between displaying a first of the cards to a second of the cards, an animation may be displayed.

17 Claims, 22 Drawing Sheets

(56) References Cited

U.S. PATENT DOCUMENTS

| | | |
|---|---|---|
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,185,062 B1 | 11/2015 | Yang et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,913,114 B1 | 3/2018 | Wu et al. |
| 2006/0010200 A1 | 1/2006 | Mousseau et al. |
| 2010/0217808 A1 | 8/2010 | Benninger |
| 2011/0202598 A1 | 8/2011 | Evans et al. |
| 2011/0231499 A1 | 9/2011 | Stovicek et al. |
| 2012/0209924 A1 | 8/2012 | Evans et al. |
| 2013/0325990 A1* | 12/2013 | Tysowski ............... H04L 51/14 709/206 |
| 2015/0046838 A1* | 2/2015 | Sano .................... G06Q 50/01 715/752 |
| 2015/0186494 A1 | 7/2015 | Gilad et al. |
| 2016/0234149 A1* | 8/2016 | Tsuda .................... H04L 51/16 |

OTHER PUBLICATIONS

"U.S. Appl. No. 14/969,841, Non Final Office Action dated Mar. 13, 2017", 10 pgs.

"U.S. Appl. No. 14/969,841, Notice of Allowance dated Oct. 19, 2017", 8 pgs.

"U.S. Appl. No. 14/969,841, Response filed Mar. 20, 2017 to Non Final Office Action dated Mar. 13, 2017", 11 pgs.

"U.S. Appl. No. 14/969,841, Response filed Oct. 2, 2017 to Final Office Action dated Jun. 30, 2017", 10 pgs.

Leyden, John, "This SMS will self-destruct in 40 seconds", [Online]. Retrieved from the Internet: <URL: http://www.theregister.co.uk/2005/12/12/stealthtext/>, (Dec. 12, 2005), 1 pg.

* cited by examiner

SIMPLIFIED MESSAGE GROUPING AND DISPLAY

CROSS REFERENCE TO RELATED APPLICATIONS

This application is a continuation of and claims priority to U.S. patent application Ser. No. 14/969,841, filed Dec. 15, 2015 and entitled "SIMPLIFIED MESSAGE GROUPING AND DISPLAY." The content of this prior application is considered part of this application, and is hereby incorporated by reference in its entirety.

TECHNICAL FIELD

Embodiments of the present disclosure relate generally to communication technologies and, more particularly, but not by way of limitation, to the simplified display of unread messages within a conversation.

BACKGROUND

Various computing devices including mobile technologies such as smartphones provide the ability for users to send messages between devices. Group messaging applications provide a convenient way for users to keep in touch with others. In various devices, different systems may be used to manage a potentially large number of messages received by a single user.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
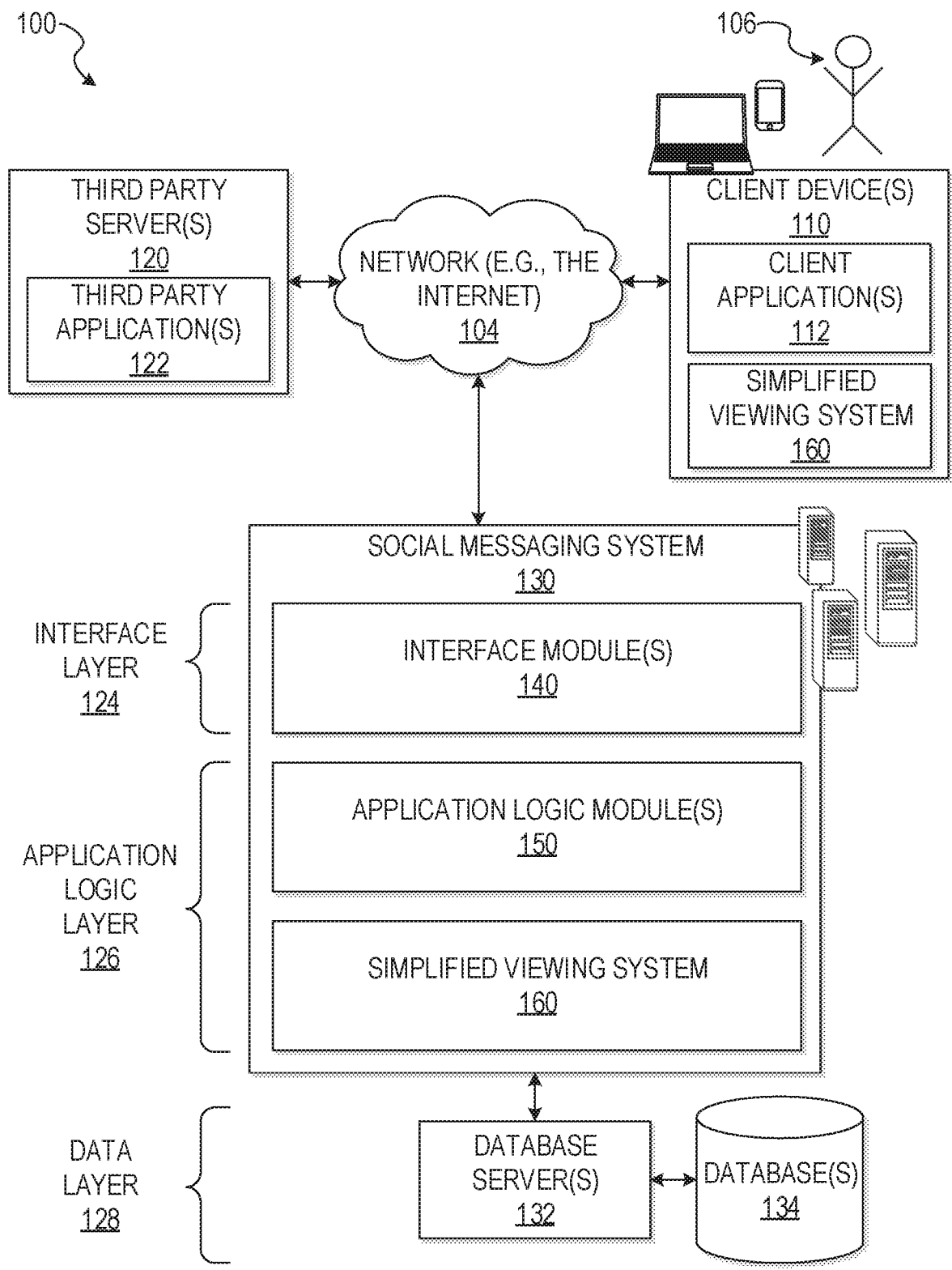
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In device messaging systems, a user may receive a large number of messages when the user participates in a group message through the use of messaging applications ("apps"). When a user has too many unread messages to scroll through, this can be frustrating for the user. This problem can arise if a user participating in a conversation has not viewed the conversation for a considerable amount of time. It can be a burden for the user to scroll through a large amount of messages to find a point at which the user last accessed the conversation. Moreover, traditional group messaging feeds display messages in reverse chronological order as a user scrolls upwards through messages, which is unintuitive. These problems are enhanced when there are a large number of users in a conversation, since this often increases the number of messages in the conversation. A user may be deterred from participating in the group conversation if the user has to scroll through tens or hundreds of messages to find out what they missed in the conversation, potentially even causing the user to eventually leave or mute the group conversation.

Current embodiments contemplate the use of overlaid cards in a stacked format, each containing one message, a few messages, or a representation of one or more messages, to show the user unread messages in the conversation in a format which is easier for the user to grasp. An overlaid card, as referred to herein, is a visual representation of the content of one or more messages stored in a memory of a device or accessible through the use of one or more servers connected to a network (e.g., the Internet). In various embodiments, one or more overlaid cards are generated by the simplified viewing system for display on a user device (e.g., on the screen of the user device). Depending on the message content which is stored within a memory of a device or accessible through the use of one or more servers connected to a network, the simplified viewing system may display text messages, linked media, geolocation information, image files, video files, or other media within an overlaid card. Moreover, in various embodiments, an overlaid card is responsive to one or more user inputs. In such embodiments, the simplified viewing system takes an action interacting with the overlaid card in response to detecting a user input via an input interface (e.g., a screen) of a user device. Such actions include, in some embodiments, activating text input methods for a user to respond to the content within the overlaid card, opening linked media within an application or using another application, navigating from one overlaid card to another overlaid card, and navigating from one overlaid card to a different portion of the application.

In some embodiments, a simplified viewing system sorts the messages from earliest timestamp (e.g. a timestamp indicating a time furthest in the past) to latest timestamp (e.g. a timestamp indicating a most current time). This sorting functionality can be used to order the overlaid cards from earliest to latest timestamp. Rather than forcing the user to scroll through a conversation indefinitely, the system displays the first overlaid card in the stack containing the earliest unread message or messages. Moreover, the user can open up the conversation and view unread messages in the order in which they were actually sent. To remind the user of their last viewed portion of the conversation, the simplified viewing system displays one or more of the messages viewed by the user with the latest message timestamp (or timestamps) at the top of the first overlaid card in some embodiments.

In a specific example, a user has twenty-four unread messages in a conversation when the user opens the application to view their messages. Rather than viewing all twenty-four messages at once, the simplified viewing system splits the messages into eight message groups. The simplified viewing system then displays each message group on its own overlaid card, ultimately creating eight overlaid cards. The first overlaid card displays four messages, the second overlaid card displays three messages, the third overlaid card displays four messages, the fourth overlaid card displays one message, the fifth overlaid card displays three messages, the sixth overlaid card displays two messages, the seventh overlaid card displays five messages, and the eighth overlaid card displays the final two messages. Accordingly, user engagement in the conversation may be increased and user experience improved since the user can avoid viewing an overwhelming number of messages at once. In various embodiments, navigation from one overlaid card to another is accomplished through receiving a user input via an interface of a client device.

Further embodiments also allow for the efficient integration of media into overlaid cards for a streamlined viewing experience regardless of the message content. In various embodiments, the disclosed system generates a media preview when a message received by a client device is a link (e.g., a Uniform Resource Locator or URL) that links to media content. In some examples, the simplified viewing system generates a miniature media preview and displays the preview in-line with other messages on a particular overlaid card. In other embodiments, for example when the system receives a hyperlink sent with no accompanying text messages, the system generates a fullscreen media preview and displays the preview on its own overlaid card. In yet other embodiments, images sent through the messaging application are displayed as fullscreen overlaid cards as well.

To illustrate these concepts, in a specific example a user receives five messages via a messaging application. The first message is a text message accompanied by a second message: a link to a location on a map. The third message is an image. The fourth message is a text message, and the fifth message is a link to an article about a new museum in Downtown Los Angeles. The simplified viewing system creates four overlaid cards. The first overlaid card contains the first text message, along with a selectable miniature preview of the map location contained in the second message. The second overlaid card is a fullscreen view of the image (i.e., the third message or the Snap). The third overlaid card solely contains the fourth text message. The fifth overlaid card contains a fullscreen preview of the article, which includes an image of the new museum, the beginning paragraph of the article, and a selectable button leading to the webpage hosting the article.

In various embodiments, a user can interact with an overlaid card through the use of various user gestures (e.g., cycling through the overlaid cards using a swipe gesture detected at a touchscreen display of the user device). For example, a user views the overlaid card depicting a fullscreen preview of the link to the article about a new museum in Downtown Los Angeles. When the user presses and holds the overlaid card via the interface of the device (e.g., for four seconds), the overlaid card is saved to the user's image gallery as an image. When the simplified viewing system receives a user gesture indicating a swipe upwards, the system activates a private chat dialog box where the recipient user can contact the user who sent the link. When the simplified viewing system receives a user gesture indicating a swipe downwards, the overlaid card view closes and the user can view a different representation of the conversation (for example, a scrolling view of all messages in the conversation).

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, creating groups of messages for display on a client device, etc.) and aspects (e.g., user inputs associated with navigation between various overlaid cards depicting messages within a conversation) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

In some embodiments, the social messaging system 130 allows users to exchange ephemeral messages that may or may not include media content. In various embodiments described herein, any messages or conversations may be ephemeral messages or ephemeral conversations as part of an ephemeral messaging system. An ephemeral message is any message with an associated deletion trigger set as part of an ephemeral message system. In some embodiments, for example, a text chat message may be set with a deletion trigger for a fixed amount of time after a first user views the message, or for a fixed amount of time after each user in a group conversation views the message. In some embodiments, a text or multimedia message may be set with a deletion trigger associated with an amount of time the content is displayed on a device. In various embodiments, these deletion triggers may be shared by all recipients, or may be individualized for different recipients. In other embodiments, a deletion trigger may be set at the beginning of a conversation by a user that initiates the conversation. In other embodiments, a deletion trigger may be standardized for each message, and the deletion trigger may or may not be modified by a device sending a message.

As shown in FIG. 1, the interface layer 124 consists of interface module(s) (e.g., a web server) 140, which receive requests from various client-computing devices and servers, such as client device(s) 110 executing client application(s) 112, and third party server(s) 120 executing third party application(s) 122. In response to received requests, the interface module(s) 140 communicate appropriate responses to requesting devices via a network 104. For example, the interface module(s) 140 can receive requests such as Hypertext Transfer Protocol (HTTP) requests, or other web-based Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. User(s) 106 can be a person, a machine, or other means of interacting with the client device(s) 110. In some embodiments, the user(s) 106 interact with the social messaging system 130 via the client device(s) 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

As illustrated in FIG. 1, the social messaging system 130 includes a simplified viewing system 160. In various embodiments, the simplified viewing system 160 can be implemented as a standalone system and is not necessarily included in the social messaging system 130. In some embodiments, the client device(s) 110 include a portion of the simplified viewing system 160 (e.g., a portion of the simplified viewing system 160 included independently or in the client application(s) 112). In embodiments where the client device(s) 110 includes a portion of the simplified viewing system 160, the client device(s) 110 can work alone or in conjunction with the portion of the simplified viewing system 160 included in a particular application server or included in the social messaging system 130. The simplified viewing system 160 provides for a streamlined viewing experience of messages within a conversation (e.g., a group conversation). The client device(s) 110 receive various messages through the social messaging system 130. The simplified viewing system 160 determines the message timestamps and whether or not the messages have been read by the client device 110, in order to group sets of messages into message groups (e.g., groups of one or more messages). The message groups are then arranged into overlaid cards, for example, fullscreen views overlaid on the interface of the client device 110 containing text messages, embedded media content, images, and other messages.

A conversation as referred to herein is any set of communications or record of a set of conversations stored in a memory of a device, or stored within one or more databases. A conversation includes two or more messages, with later messages initiated in response to one or more earlier messages or otherwise associated with earlier messages. Messages within a conversation may comprise text, image files, hyperlinks, audio files, video files, and other media. A group conversation as referred to herein is a conversation involving three or more users, user accounts, or devices that send or receive any messages of a set of messages in a communication. A group conversation may also be considered as any conversation where one or more messages that make up a conversation are sent to two or more recipients.

Figure 2:
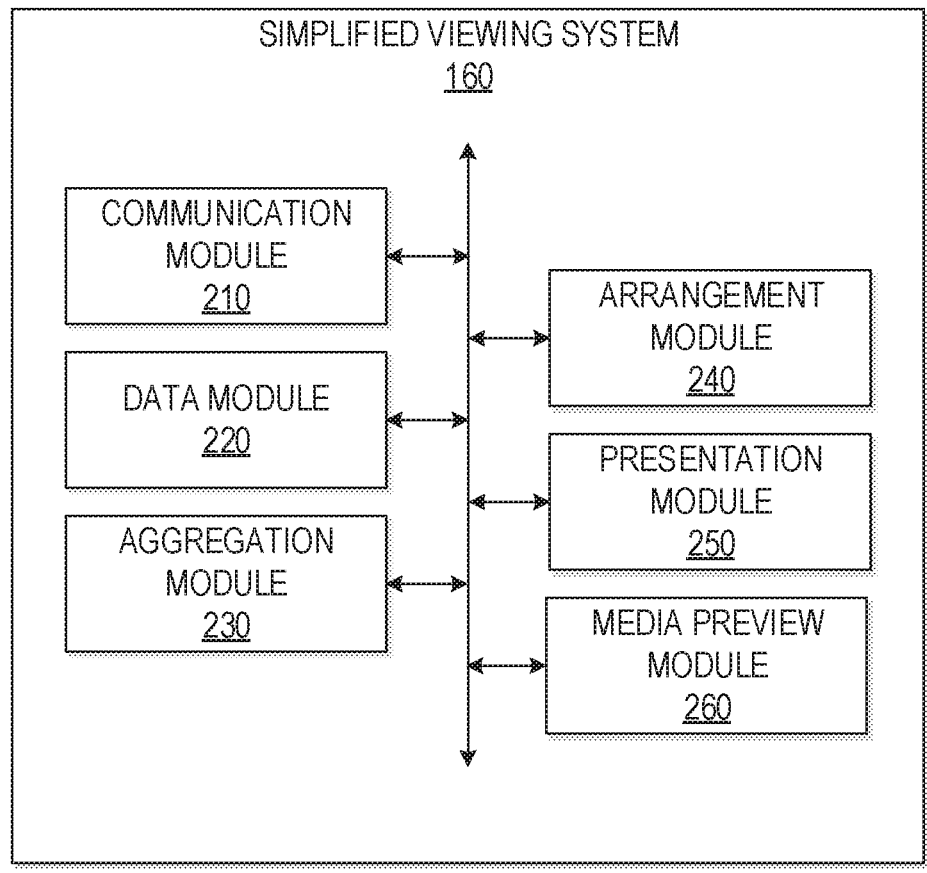
FIG. 2 is a block diagram illustrating an example embodiment of a simplified viewing system for a user to view messages within a conversation, according to some example embodiments.

FIG. 2 is a block diagram 200 of the simplified viewing system 160. The simplified viewing system 160 is shown to include a communication module 210, a data module 220, an aggregation module 230, an arrangement module 240, a presentation module 250, and a media preview module 260. All, or some, of the modules 210-220 260 communicate with each other, for example, via a network coupling, shared memory, and the like. Each module of the modules 210-260 can be implemented as a single module, combined into other modules, or further subdivided into multiple modules. Other modules not pertinent to example embodiments can also be included, but are not shown.

The communication module 210 provides various communication functionality. For example, the communication module 210 receives a plurality of messages within a group conversation accessible by one or more client devices. In a specific example, the communication module 210 receives a variety of message content, including text messages, images, embedded links, and the like. The communication module 210 exchanges network communications with the database server(s) 132, the client device(s) 110, and the third party server(s) 120. The information retrieved by the communication module 210 includes data associated with the user (e.g., member profile data from an online account or social network service data) or other data to facilitate the functionality described herein.

The data module 220 provides various data storage and analysis functionality. For example, the data module 220 stores various data attributes of messages that are received by the communication module 210. In various examples, the data module 220 stores a timestamp for each message received by the communication module 210 and also marks each of the messages as being either read or unread by the user device. In some embodiments, the data module 220 operates on a client device containing a memory and one or more processors, the module executing instructions within the one or more processors to store various data attributes of messages. In other embodiments, the data module 220 operates on a server. In some example embodiments, the data module 220 also stores the type of content contained within each message. For example, the data module 220 stores a message type including a link to a location, an image thumbnail, an image, an audio file, or text. Any combination of such messages may be part of a conversation as described herein. Additionally, any such message including a link, an image, an audio file, or text, or any combination of these may be an ephemeral message including an association with a deletion trigger.

The aggregation module 230 provides functionality to group together messages that are received, for instance, by the communication module 210. For example, the aggregation module 230 groups messages together based on their sender, or based on the timestamp of each respective message. Further examples of grouping methods are described in relation to FIG. 12. In various embodiments, the aggregation module 230 groups one or more messages within a group conversation into a set of messages. For example, messages which are marked as unread by the data module 220 are grouped into sets of messages by the aggregation module 230. In example embodiments, aggregation module 230 groups one or more messages into a first set of messages, and one or more messages into a second set of messages, ensuring that all messages in the second set have timestamps later in time than the messages in the first set.

The arrangement module 240 provides functionality to arrange various messages onto a preview window. The preview window is an alternative viewing format which, in various embodiments, improves a user's group messaging experience by breaking up a group conversation into chunks of one or more messages, with each chunk of messages displayed on a single preview window. For example, the preview window is depicted on the user interface of a client device as a stacked card overlaid over the normal group message view. In another example, the preview window depicts a fullscreen view of an image sent by one of the participants in the group conversation. Given the messages within each set of messages created by the aggregation module 230, in various embodiments the arrangement module 240 arranges the messages with appropriate spacing, appropriate orientation, and an appropriate font size to allow a user to read unread messages efficiently.

The presentation module 250 provides various presentation and user interface functionality operable to interactively present and receive information to and from the user. For instance, the presentation module 250 is utilizable to present one or more preview windows, created by the arrangement module 240, on the user interface of a client device. In one example, the presentation module 250 displays a first preview window as well as a second preview window. In various embodiments, the presentation module 250 presents or causes presentation of information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 250 provides many other user interfaces to facilitate functionality described herein. The term "presenting" as used herein is intended to include communicating information or instructions to a particular device that is operable to perform presentation based on the communicated information or instructions.

The media preview module 260 allows the simplified viewing system 160 to display linked media content efficiently. The media preview module 260, in various embodiments, detects when a message contains linked media and generates a preview of the linked media for display on the user interface of the device. In some instances, the media preview module 260 generates a minimized preview to be displayed between other messages on a preview window. In other instances, the media preview module 260 generates a fullscreen preview window which predominantly depicts the linked media on the preview window.

Figure 3:
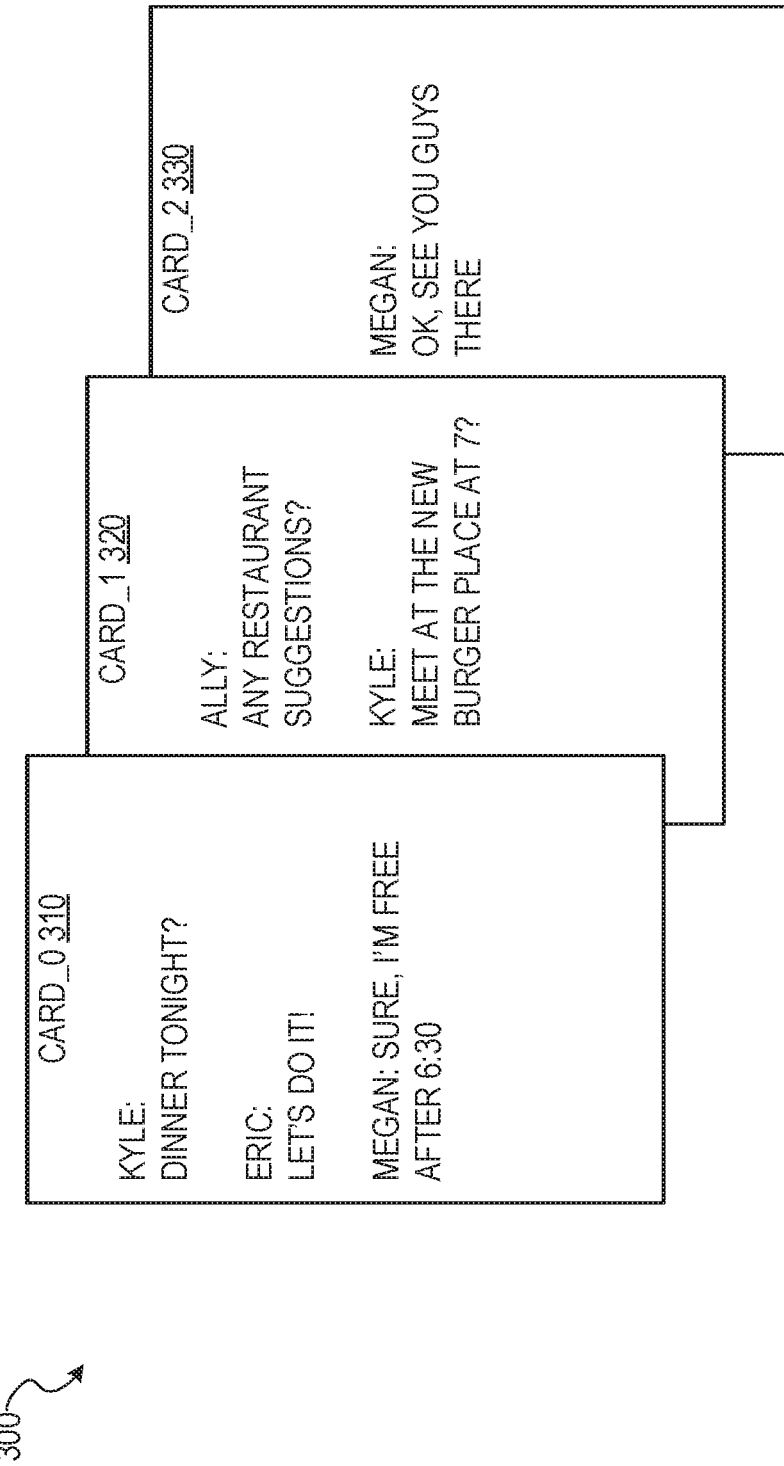
FIG. 3 is an illustrative diagram depicting overlaid cards with a display order that contain "bite-sized" groups of messages for streamlined message viewing, according to some example embodiments.
Figure 3:
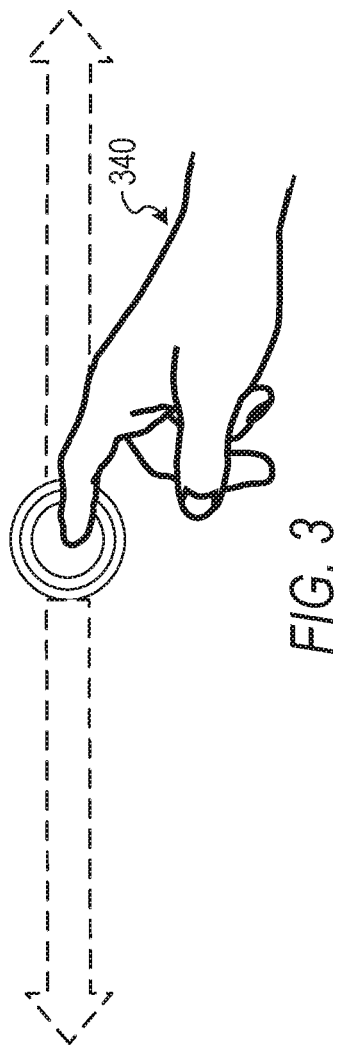

FIG. 3 is an illustrative diagram 300 depicting a stacked card view of messages within a conversation implemented through use of the simplified viewing system 160. In various embodiments, messages from one or more users within a conversation are grouped and the groups of messages are displayed on overlaid cards: CARD_0 310. CARD_1 320, and CARD_2 330. Thus, the simplified viewing system 160 helps the user process unread messages in a group conversation by displaying the unread messages in smaller groups of messages, rather than the user scrolling upwards to find where they last viewed the contents of the conversation. In some example embodiments, the last message marked by the data module 220 as viewed by a user device is displayed at the top of the first card (e.g., CARD_0 310). In other example embodiments, the last few messages marked as read by the data module 220 (for example, three messages) are displayed before the unread messages. In yet other example embodiments, messages marked as read by data module 220 which are received within a threshold amount of time prior to the first unread message are displayed before the unread messages (for example, all read messages received up to 30 seconds, one minute, 10 minutes, or any other such threshold prior to the first unread message are displayed before any unread messages on CARD_0 310). Based on a user input 340 (e.g., a particular input gesture of the user) received via an interface of a device (e.g., use input received via a touchscreen input or buttons on the side of a phone), the user is able to scroll from one card to another card using the simplified viewing system 160. In various example embodiments, the user input 340 to transition from one card to another is a swiping gesture (e.g., swiping horizontally). To illustrate these concepts, in a specific example, the user has six unread messages, which are grouped, classified, allocated, or otherwise distributed into three overlaid cards. In this particular example, the first overlaid card displays three messages, the second overlaid card displays two messages, and the last overlaid card displays one message. In an example, the user transitions from one overlaid card to the next overlaid card (cycling through groups of messages) by providing user input indicating a horizontal gesture to the left to transition from the first, to the second, and to the third card. The user can swipe in another direction (e.g., horizontally to the right) to transition backwards from the third, to the second, and to the first card. In some embodiments, when the user transitions past the last card in the series through the user input 340, the social messaging system 150 displays an alternate view of the conversation. For example, the alternate view displays all of the messages without splitting them into groups, and displays the messages with a smaller font size than the stacked card view, in some embodiments.

Figure 4:
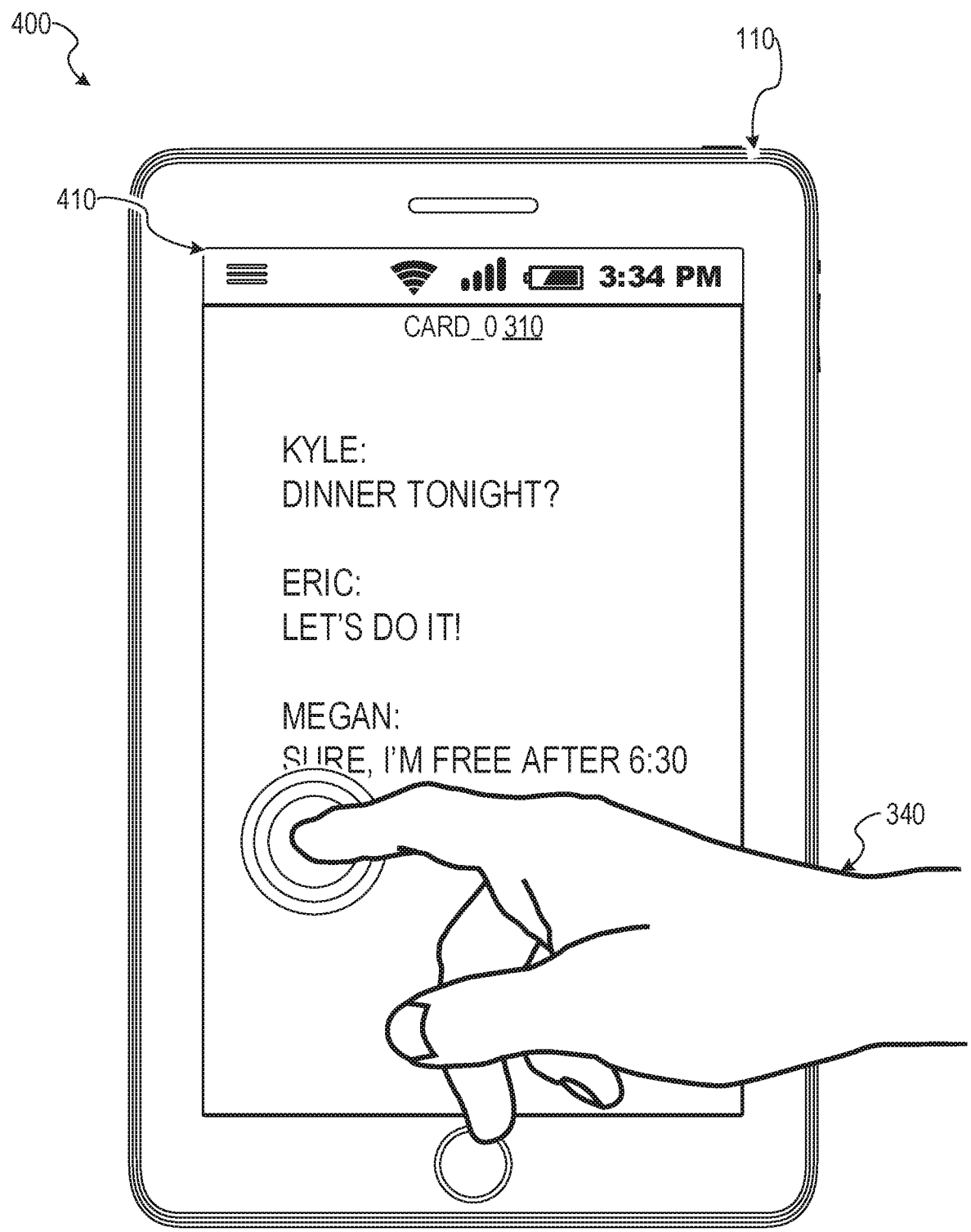
FIG. 4 is an example user interface diagram, depicting the display of an overlaid card on the interface of a client device (e.g., a smartphone), according to some example embodiments.

Referring now to FIG. 4, a user interface diagram 400 depicting the simplified viewing system 160 is shown. As described in FIG. 2, the presentation module 250 is operable to display overlaid cards depicting one or more messages on the interface 410 (e.g., displayed on a screen) of the client device 110. In the example depicted in FIG. 4, CARD_0 310 is depicted on interface 410, and the interface 410 is receptive to the user input 340 causing a change in display from the CARD_0 310 to another overlaid card or an alternative view of the conversation. In some embodiments, the name of the user sending a message is displayed alongside the message on the CARD_0 310 (e.g., Kyle, Eric. Megan). In other embodiments, the presentation module 250 displays other message data next to each message within the overlaid card including a message timestamp, a sender profile picture, an icon depicting a relationship between the message sender and the recipient, an icon depicting the message sender's emotion or current activity at the time of sending the message, a message sender's username, means for sending feedback on each message through a user device (e.g., a "Like" button, a "Favorite" button, or a "Dislike" button), a geolocation (e.g., as determined via a Global Positioning System or GPS component of the user device) of each device sending a message at the time the message was sent, and other message data.

Figure 5:
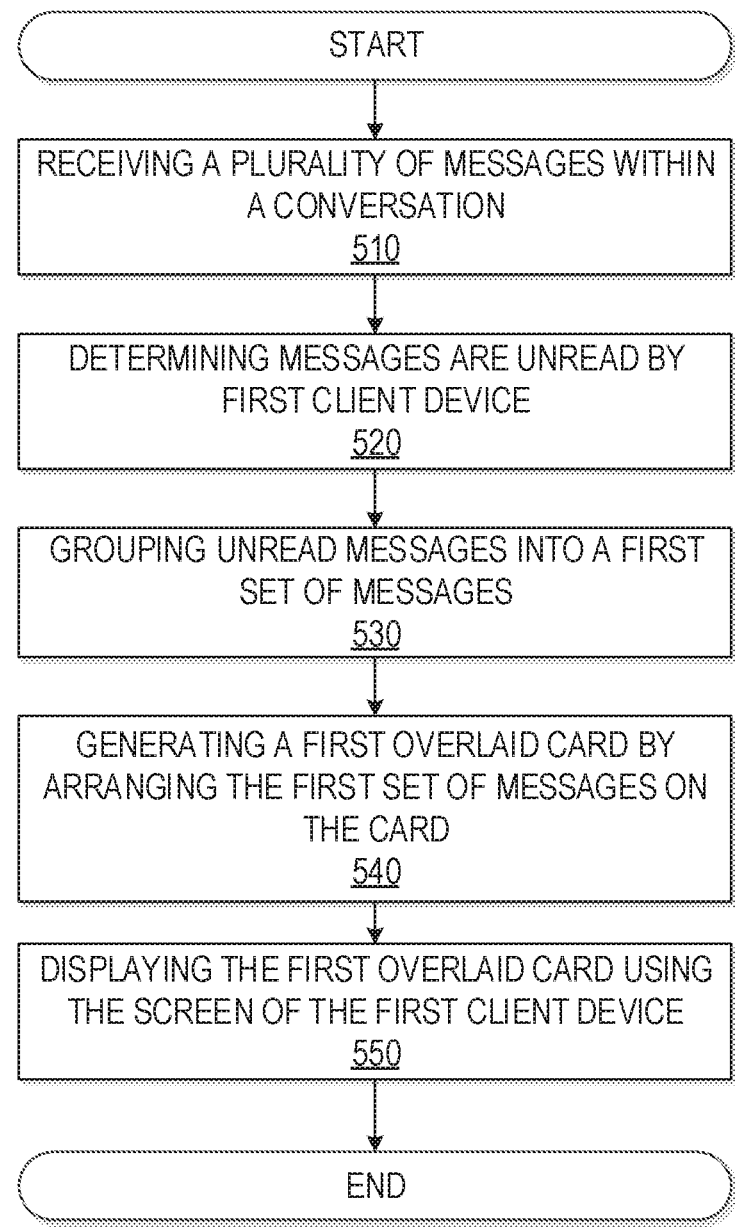
FIG. 5 is an example flow diagram depicting a method for displaying messages on a client device.

FIG. 5 is a flow diagram 500 depicting an example method for displaying messages via the simplified viewing system 160. At step 510, the communication module 210 receives a plurality of messages within a conversation. For example, the client device 110 is in signal communication with one or more other devices, and the communication module 210 receives one or more messages through WI-FI®, BLUETOOTH®, 3G, 4G, LTE® or another signal communication.

At step 520, the data module 220 determines that one or more messages are unread by a first client device 110. In various embodiments, the data module 220 stores an index or a flag to track whether a message is read or unread. For example, an integer value is set at zero and changed to one upon a user viewing the message, or a Boolean value is set at FALSE and changed to TRUE once the message is viewed to keep track of whether a message is unread or not.

At step 530, the aggregation module 230 groups the unread messages into a first set of messages. The first set of messages contains one or more messages. In some embodiments, the messages are arranged by timestamp (or another temporal indication associated with the messages), while the messages are arranged by user in other embodiments.

At step 540, the arrangement module 240 generates a first overlaid card by arranging the first set of messages on the card. For example, the arrangement module 240 determines the font, font size, and the color of the text to be displayed on the overlaid card. In various embodiments, the arrangement module 240 displays the messages in the first set vertically centered on the interface 410 of the client device 110. In yet other embodiments, the arrangement module 240 places the messages slightly above vertical-center on the screen, to account for a user's hand holding a client device 110 such as a phone or a tablet. At step 550, the presentation module 250 displays, or causes display of, the first overlaid card using an interface (e.g., an interface displayed on a screen) of the first client device 110.

Figure 6:
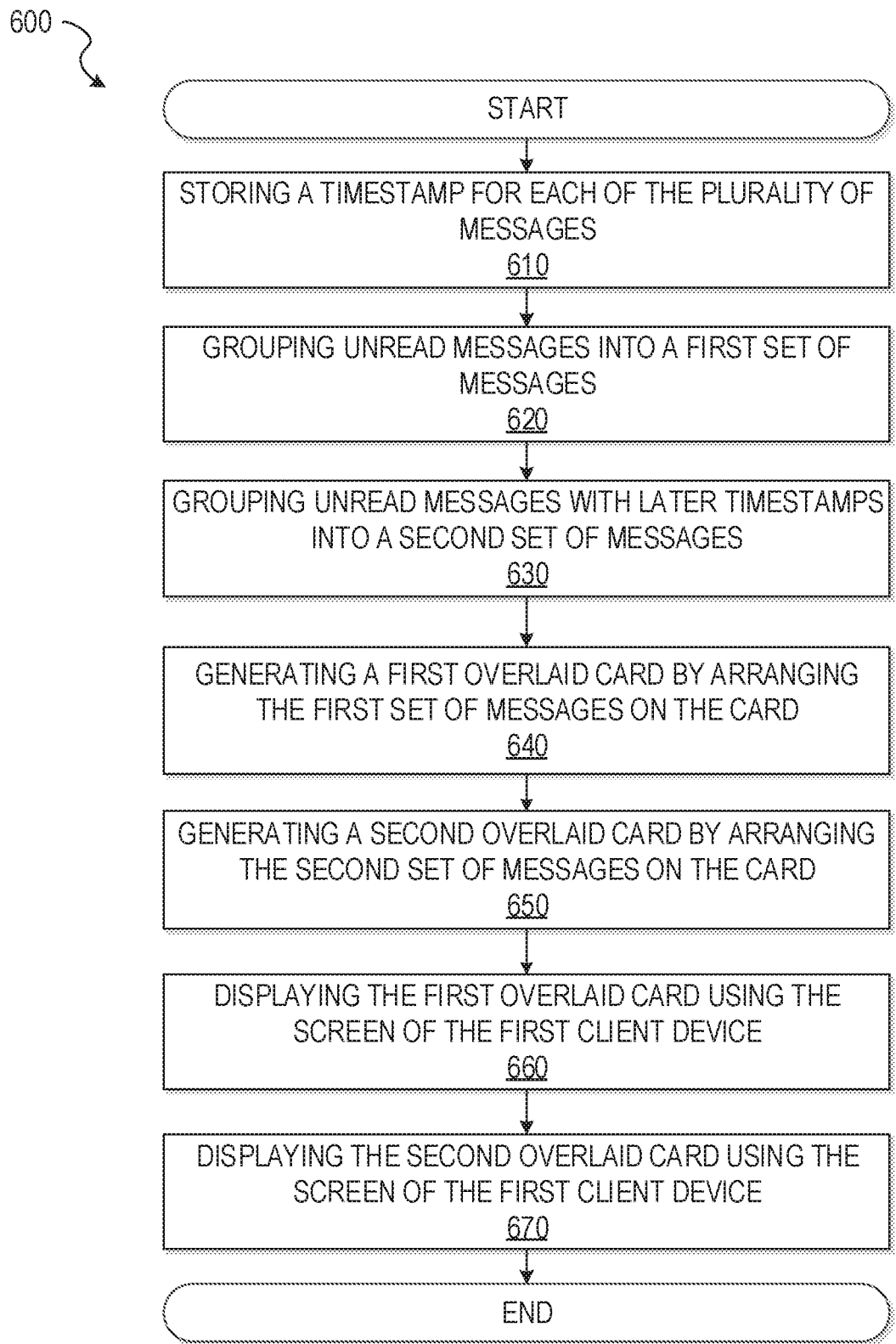
FIG. 6 is an example flow diagram depicting a method for displaying more than one overlaid card containing one or more messages on a client device, according to some example embodiments.

FIG. 6 is an example flow diagram 600 depicting a method for displaying more than one overlaid card on the client device 110 using the simplified viewing system 160. At step 610, the data module 220 stores a timestamp for each of the plurality of messages. For example, the data module 220 stores a timestamp at which each message is received by the client device 110. In another example, the data module 220 stores a timestamp at which each message is sent from its originating device or another instance of time associated with a particular message of the messages. At step 620 (which is similar to step 530 as described in FIG. 5), the aggregation module 230 groups messages marked as unread into a first set of messages.

At step 630, the aggregation module 230 groups unread messages into a second set of messages, where messages in the second set of messages have later timestamps than messages in the first set of messages. In some embodiments, all, or some, messages in the second set of messages have timestamps later in time than any message in the first set of messages. In other embodiments, if the difference between message timestamps is less than a threshold amount of time (e.g., all, or some, messages were sent within a span of 30 seconds, one minute, 10 minutes, or any other such threshold), the aggregation module 230 analyzes the content of each message to group similar messages into each set of messages. For example, messages including similar keywords such as "movie." "theater." "showing," and "ticket" would be placed into the first set of messages, while messages with keywords similar to each other but unrelated to a movie such as "hike," "shoes," "miles," and "trail" would be placed into the second set of messages.

Once the aggregation module 230 groups the messages into a first set and a second set of messages, the arrangement module 240 arranges the message content into a format suitable for easy viewing on an interface of the client device 110. Thus, at step 640 (which is similar to step 540 in FIG. 5), the arrangement module 240 generates a first overlaid card by arranging the first set of messages on the card. At step 650, the arrangement module 240 generates a second overlaid card by arranging the second set of messages on the card. At step 660 (which is similar to step 550 in FIG. 5), the presentation module 250 displays the first overlaid card using the interface (e.g., including a screen) of the first client device 110. At step 670, the presentation module 250 displays the second overlaid card using the interface of the first client device 110.

In one example, there are five unread messages in a conversation and all are text messages. The first three messages are grouped into the first set of messages in step 620 and displayed as the first overlaid card on the interface 410 of the client device 110 in step 660. Using the aggregation module 230, the last two messages are grouped into the second set of messages in step 630 and displayed as the second overlaid card in step 670, after the first overlaid card has been displayed.

In another example, the messages comprise three unread messages. The first two messages are text messages, and the third message is a link to a movie review. The first two messages are grouped into the first set of messages by the aggregation module 230 in step 620. The third message is grouped into the second set of messages in step 630, where the second set of messages solely contains the third message. The first two messages are displayed as the first overlaid card in step 660, and the third message is displayed as the second overlaid card in step 670. In various embodiments responding to the three example messages, the third media message is displayed in a fullscreen media card, where part of the media card displays an image associated with the movie review and the rest of the media card displays the beginning text of the review, as well as a selectable link (e.g., a button that says "Go to Review") in order to redirect the user to the site hosting the movie review. For example, the image representing the movie review is displayed on the top third of the screen, while the text and the link to the review take up the bottom two-thirds of the screen.

Figure 7:
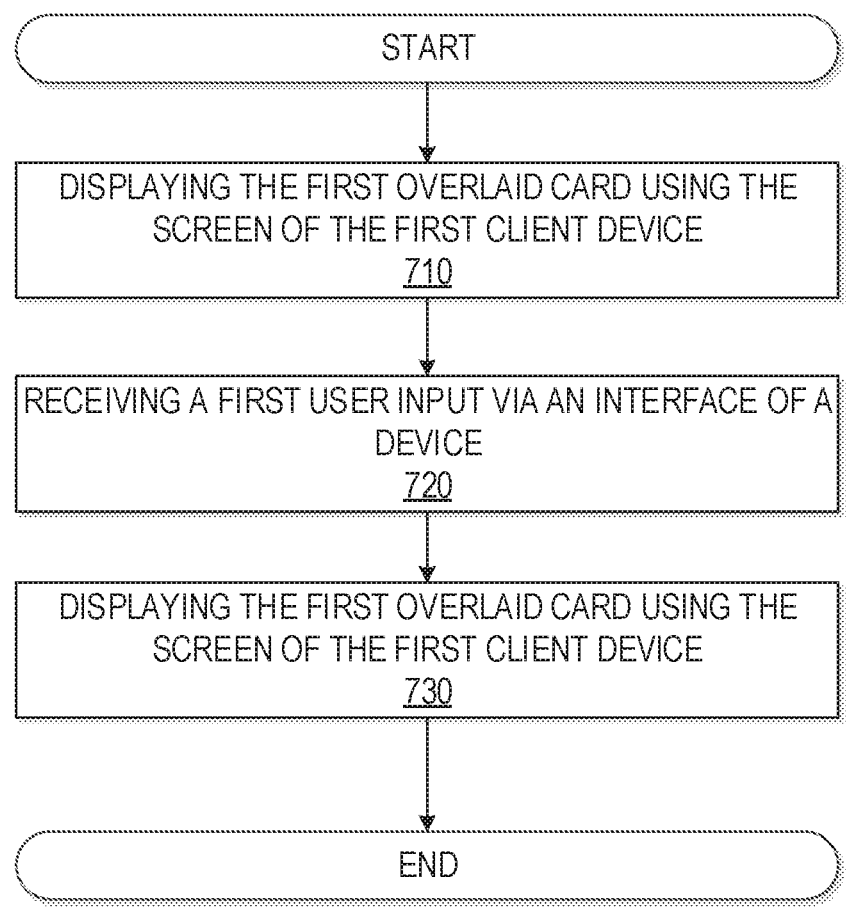
FIG. 7 is an example flow diagram depicting a mechanism for transitioning from the display of one overlaid card to another overlaid card.

FIG. 7 is a flow diagram 700 depicting an example mechanism by which the simplified viewing system 160 transitions between displaying various overlaid cards. At step 710 (which is similar to step 550, as described in FIG. 5), the presentation module 250 displays the first overlaid card using the interface (e.g., a screen) of the first client device 110. At step 720, the simplified viewing system 160 receives a first user input via an interface of a device. Once the system receives the first user input in step 710, the presentation module 250 displays the second overlaid card using the interface of the first client device 110 at step 730 (similar to step 670, as described in connection with FIG. 6).

Figure 8:
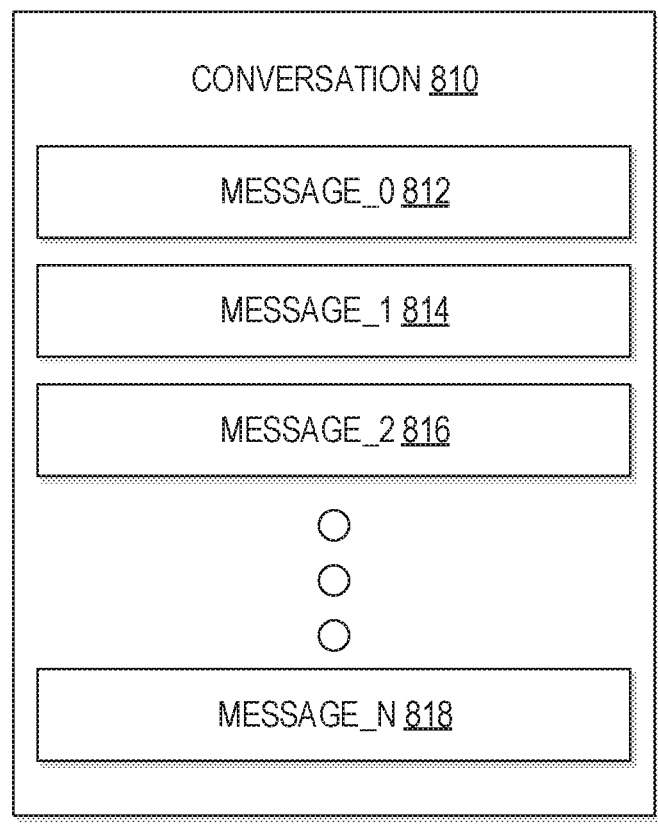
FIG. 8 is a data structure diagram illustrating a plurality of messages that are stored within a conversation on a client device, according to some example embodiments.

FIG. 8 is a data structure diagram 800 depicting the plurality of messages which are stored within a conversation on a user device. As seen in FIG. 8, conversation 810 contains multiple messages: MESSAGE_0 812. MESSAGE_1 814, and MESSAGE_2 816, up to MESSAGE_N 818. For example, conversation 810 is a group conversation within a messaging application on the client device 110. In various embodiments, messages are sent to the client device 110 in various formats including text messages, picture messages, audio files, and video files.

Figure 9:
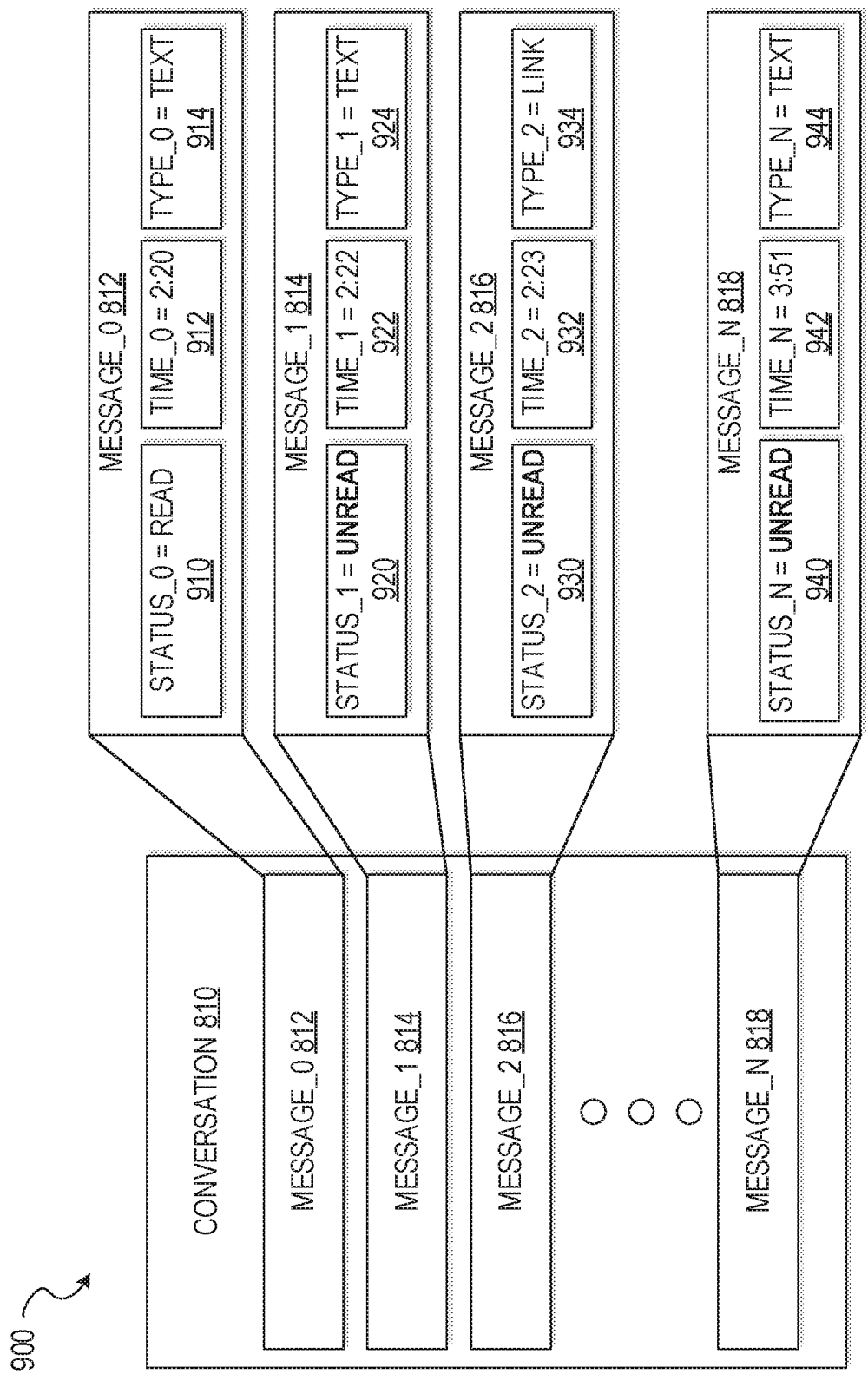
FIG. 9 is a data architecture diagram illustrating how various attributes of each message are tracked, according to some example embodiments.

Referring now to FIG. 9, an example data architecture 900 is shown. As described above in connection with FIG. 2, the data module 220 provides functionality to store various attributes of messages received by the client device 110. In the example depicted in FIG. 9, each message contains a message status (i.e., read or unread by the client device 110), a message timestamp, and a message type (e.g., text, image, video, music, link). Within conversation 810, messages MESSAGE_0 812. MESSAGE_1 814, MESSAGE_2 816, up to MESSAGE_N 818 are depicted as described in FIG. 8. MESSAGE_0 812 contains three attributes: STATUS_0 910, TIME_0 912, and TYPE_0 914. In the example depicted, MESSAGE_0 812 was read by the client device 110, has a timestamp indicating a time of 2:20, and is a text message. MESSAGE_1 814 contains three associated attributes: STATUS_1 920, TIME_1 922, and TYPE_1 924. In same example depicted. MESSAGE_1 814 is still unread by the client device, has a timestamp of 2:22, and is a text message. MESSAGE_2 816 contains three attributes: STATUS_2 930, TIME_2 932, and TYPE_2 934. In the example depicted. MESSAGE_2 816 is still unread by the client device, has a timestamp of 2:23, and is a message containing a link. For example, the link is a link to a webpage, a review of a restaurant, or a location on a maps application. MESSAGE_N 818 contains three attributes: STATUS_N 940. TIME_N 942, and TYPE_N 944. In the example depicted, MESSAGE_2 818 was read by the client device, has a timestamp of 3:51, and is a text message.

Figure 10:
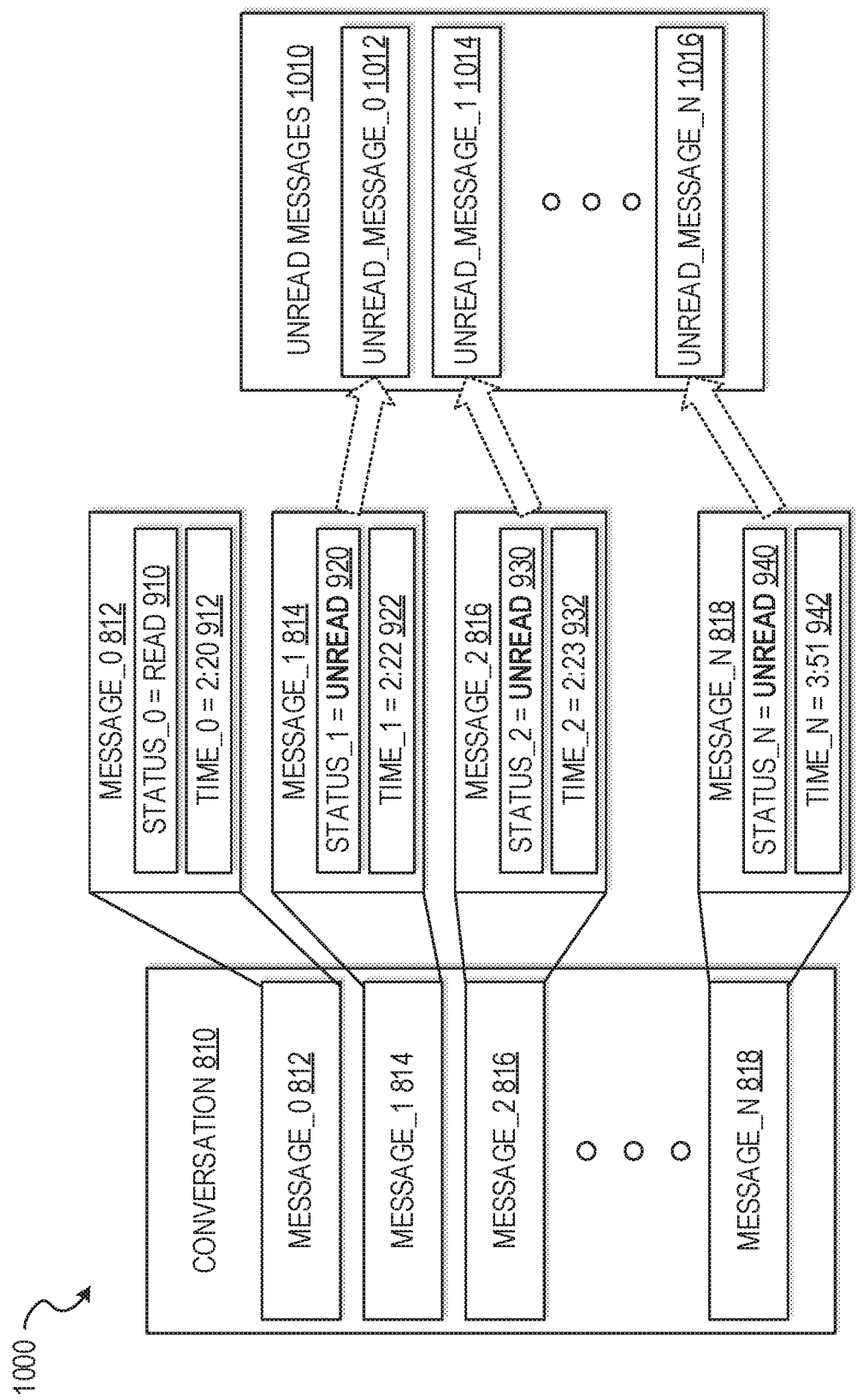
FIG. 10 is a data structure diagram depicting how a list of unread messages is created, according to some example embodiments.

FIG. 10 is another data structure diagram 1000 depicting the simplified viewing system creating a list of unread messages. As described in FIG. 8, conversation 810 contains numerous messages including MESSAGE_0 812, MESSAGE_1 814, and MESSAGE_2 816, up to MESSAGE_N 818. MESSAGE_0 812 has a STATUS_0 910 and a timestamp TIME_0 912. MESSAGE_1 814 has a STATUS_1 920 and a timestamp TIME_1 922. MESSAGE_2 816 has a STATUS_2 930 and a timestamp TIME_2 932. MESSAGE_N 818 has a STATUS_N 940 and a timestamp TIME_N 942. As seen in FIG. 10, MESSAGE_0 812 is marked as read, while the other messages are marked as unread. Therefore, MESSAGE_0 is not placed into the list of unread messages 1010. MESSAGE_1 814, MESSAGE_2 816, up to MESSAGE_N 818 are marked as unread, so the messages are placed into the list of unread messages 1010 as UNREAD_MESSAGE_0 1012. UNREAD_MESSAGE_1 1014, and UNREAD_MESSAGE_N 1016, respectively. Thus, the aggregation module 230 is able to use the list of unread message 1010 in order to group unread messages into one or more sets of messages.

Figure 11:
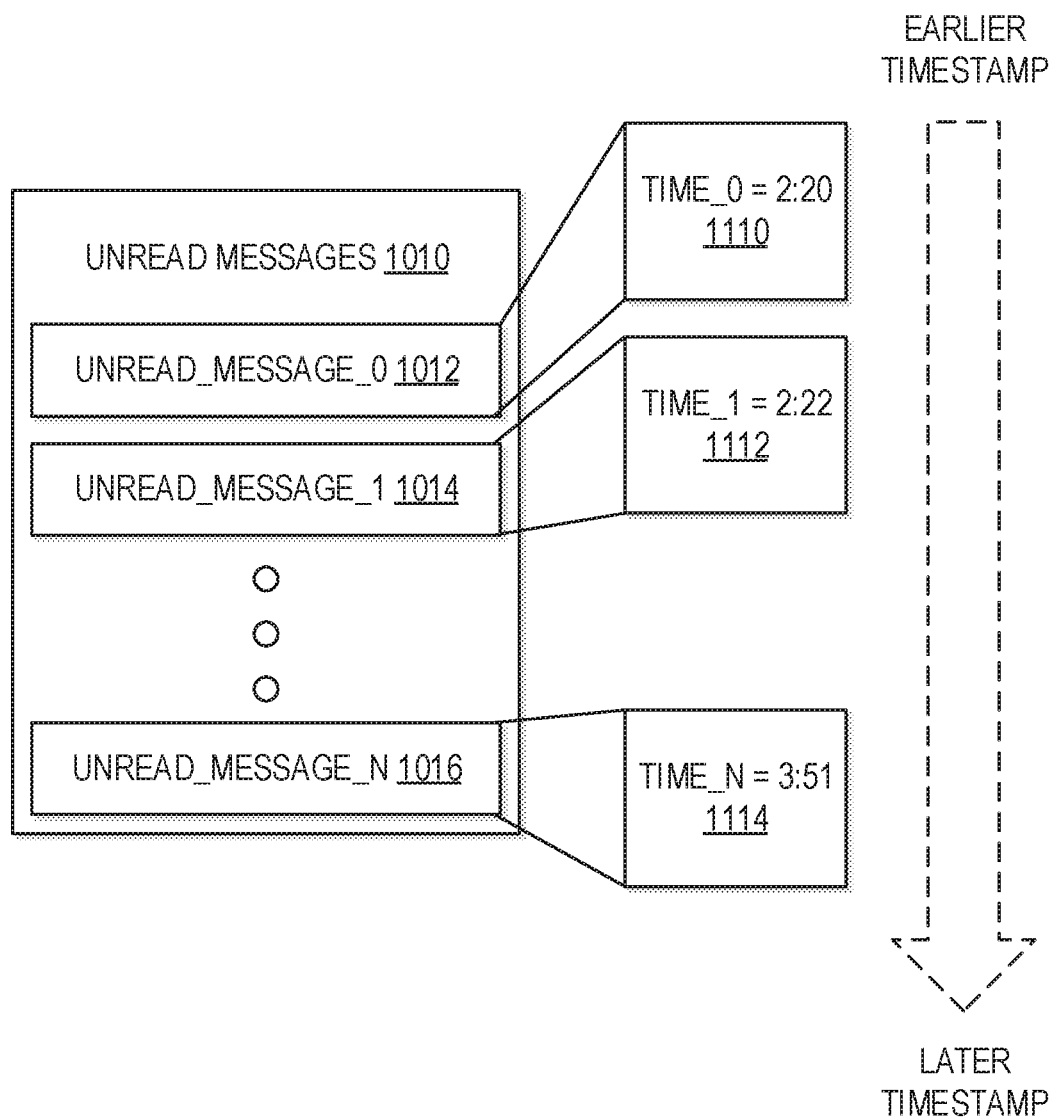
FIG. 11 is a data structure diagram illustrating an example embodiment where unread messages are ordered by message timestamp.

FIG. 11 is a data structure diagram 1100 illustrating an embodiment where the simplified viewing system 160 arranges unread messages in order of timestamp. As described in FIG. 10, the list of unread messages 1010 contains unread messages UNREAD_MESSAGE_0 1012 and UNREAD_MESSAGE_1 1014, up to UNREAD_MESSAGE_N 1016. The unread messages each have a timestamp, depicted as TIME_0 1110 with a value of 2:20, TIME_1 1112 with a value of 2:22, and TIME_N 1114 with a value of 3:51. In various embodiments, timestamps have a precision up to one second or one millisecond. Moreover, in some embodiments, timestamps are depicted in 12-hour notation, while timestamps are depicted in 24-hour notation in other embodiments. In the example data structure diagram 1100, timestamps are depicted as being ordered from earliest timestamp to latest timestamp. In some embodiments, however, the timestamps are ordered from latest timestamp to earliest timestamp.

Figure 12:
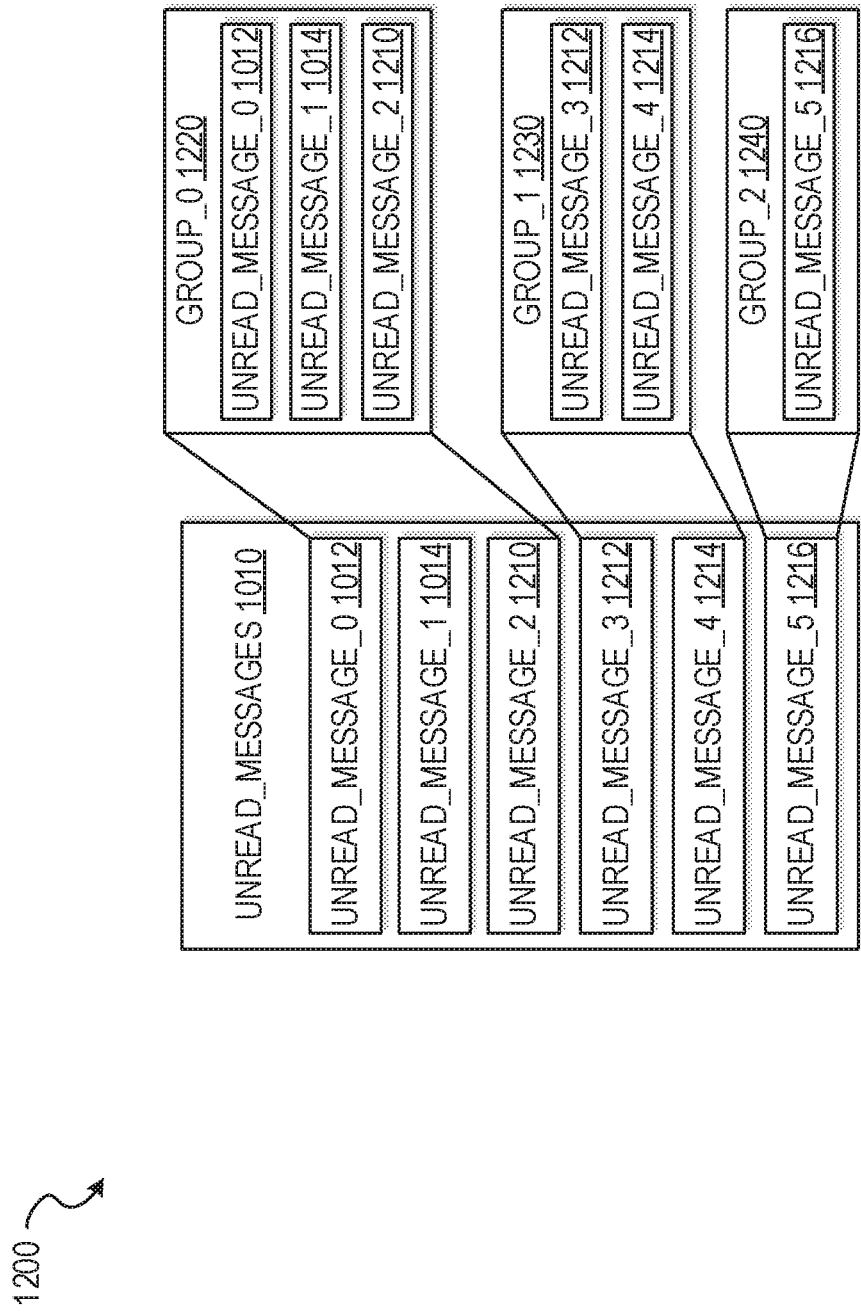
FIG. 12 is an example data structure diagram illustrating how unread messages are grouped together into message groups.

FIG. 12 is an example data structure diagram 1200 illustrating how the aggregation module 230 groups unread messages together into message groups. In the example diagram 1200, the list of unread messages 1010 contains six messages: UNREAD_MESSAGE_0 1012, UNREAD_MESSAGE_1 1014, UNREAD_MESSAGE_2 1210. UNREAD_MESSAGE_3 1212, UNREAD_MESSAGE_3 1214, and UNREAD_MESSAGE_4 1216. As shown in the example diagram 1200, the unread messages are split into three groups by the aggregation module 230. GROUP_0 1220 contains the first three messages 1012, 1014, and 1210. GROUP_1 1230 contains the next two messages 1212 and 1214. GROUP_2 1240 only contains one message 1216. In some example embodiments, messages are split up according to timestamp. For example, if there is a difference in timestamp over a certain amount of time between two consecutive messages, for example a period of time greater than five minutes, the later message automatically becomes the first message of a new group. In various embodiments, there is a limit to the amount of text within each message group. For example, groups are limited to a certain number of messages (e.g., no more than four messages per group), or a certain number of words, or a certain number of characters. In such embodiments, if adding a subsequent message will cause the message group to exceed the threshold amount of text, the subsequent message automatically becomes the first message of a new message group. In some example embodiments, not all of the unread messages are placed into message groups; instead, only messages marked as highlights are placed into message groups to display to a user. Messages are marked as highlights, in various embodiments, according to the number of likes, sender attributes, relationship between the sending user and the recipient user, keywords within the message, length of the message, number of message views, the sending user marking the message as important, and the like.

Figure 13:
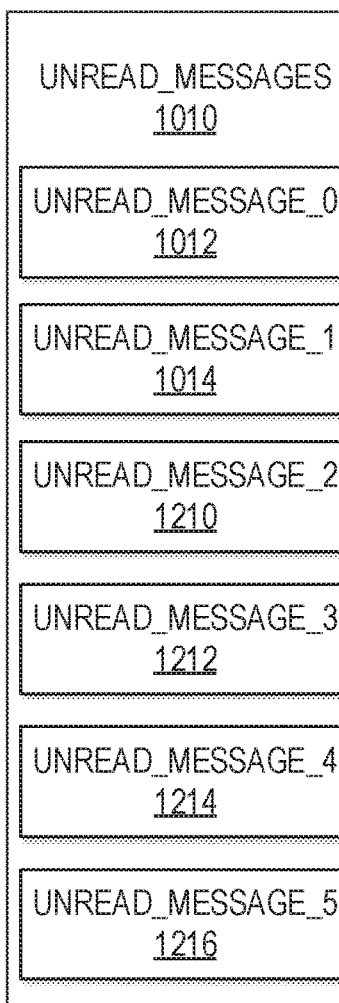
FIG. 13 is an example data structure diagram depicting how message groups are arranged onto overlaid cards to be displayed on a client device in some embodiments.
Figure 13:
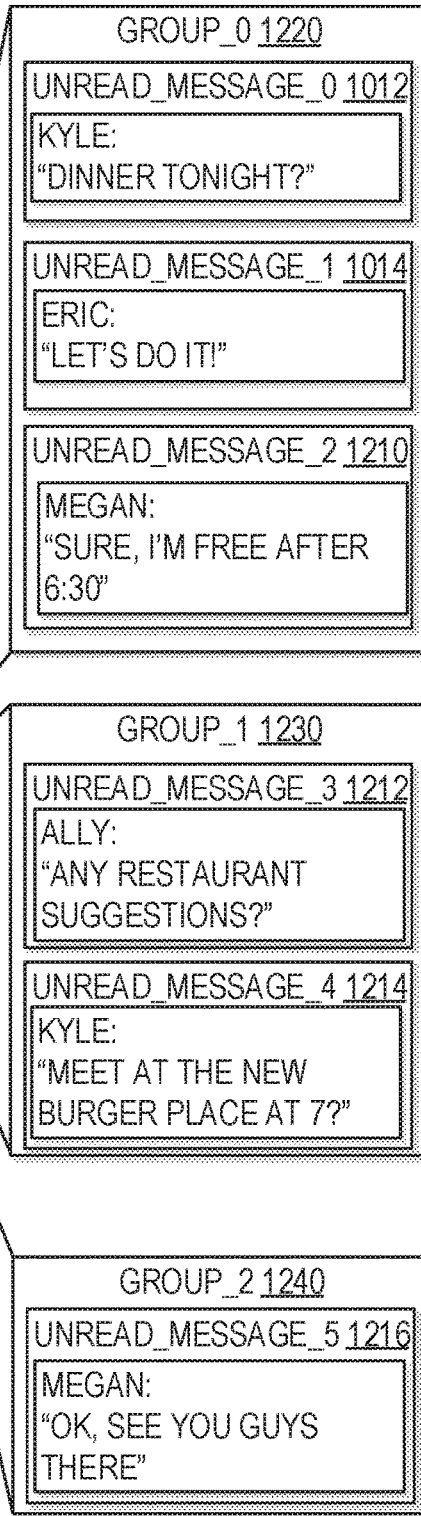
Figure 13:
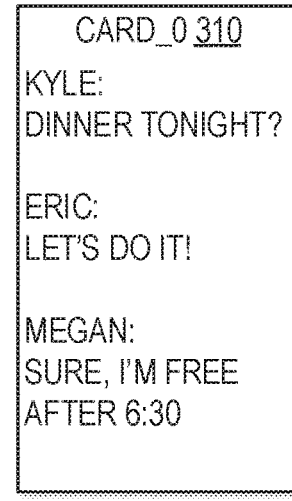
Figure 13:
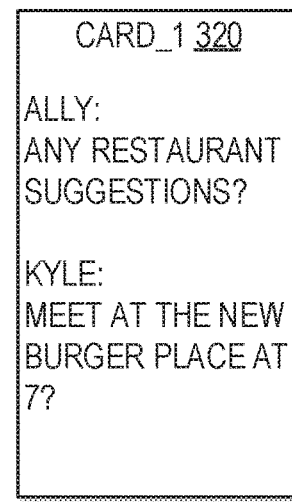
Figure 13:

FIG. 13 is an example data structure diagram 1300 depicting how the arrangement module 240 arranges message groups onto overlaid cards. As depicted in FIG. 12, a list of unread messages 1010 contains six messages: UNREAD_MESSAGE_0 1012. UNREAD_MESSAGE_1 1014. UNREAD_MESSAGE_2 1210, UNREAD_MESSAGE_3 1212, UNREAD_MESSAGE_3 1214, and UNREAD_MESSAGE_4 1216. The aggregation module 230 groups the six messages into three groups. GROUP_0 1220 contains the first three messages: 1012, 1014, and 1210. GROUP_1 1230 contains the next two messages: 1212 and 1214. GROUP_2 1240 contains one message: 1216. The arrangement module 240 then arranges the messages onto separate overlaid cards, where each overlaid card depicts the messages within one message group. CARD_0 310 displays the three messages in GROUP_0 1220, while CARD_1 320 displays the two messages in GROUP_1 1230 and CARD_2 330 displays the messages in GROUP_2 1240. Accordingly, the aggregation module 230 splits the list of unread messages 1010 into groups and the arrangement module 240 arranges the messages within each group an overlaid card. The overlaid cards are then displayed on the interface of a client device 110 to provide for a streamlined viewing experience of a user's unread messages within a conversation.

Figure 14:
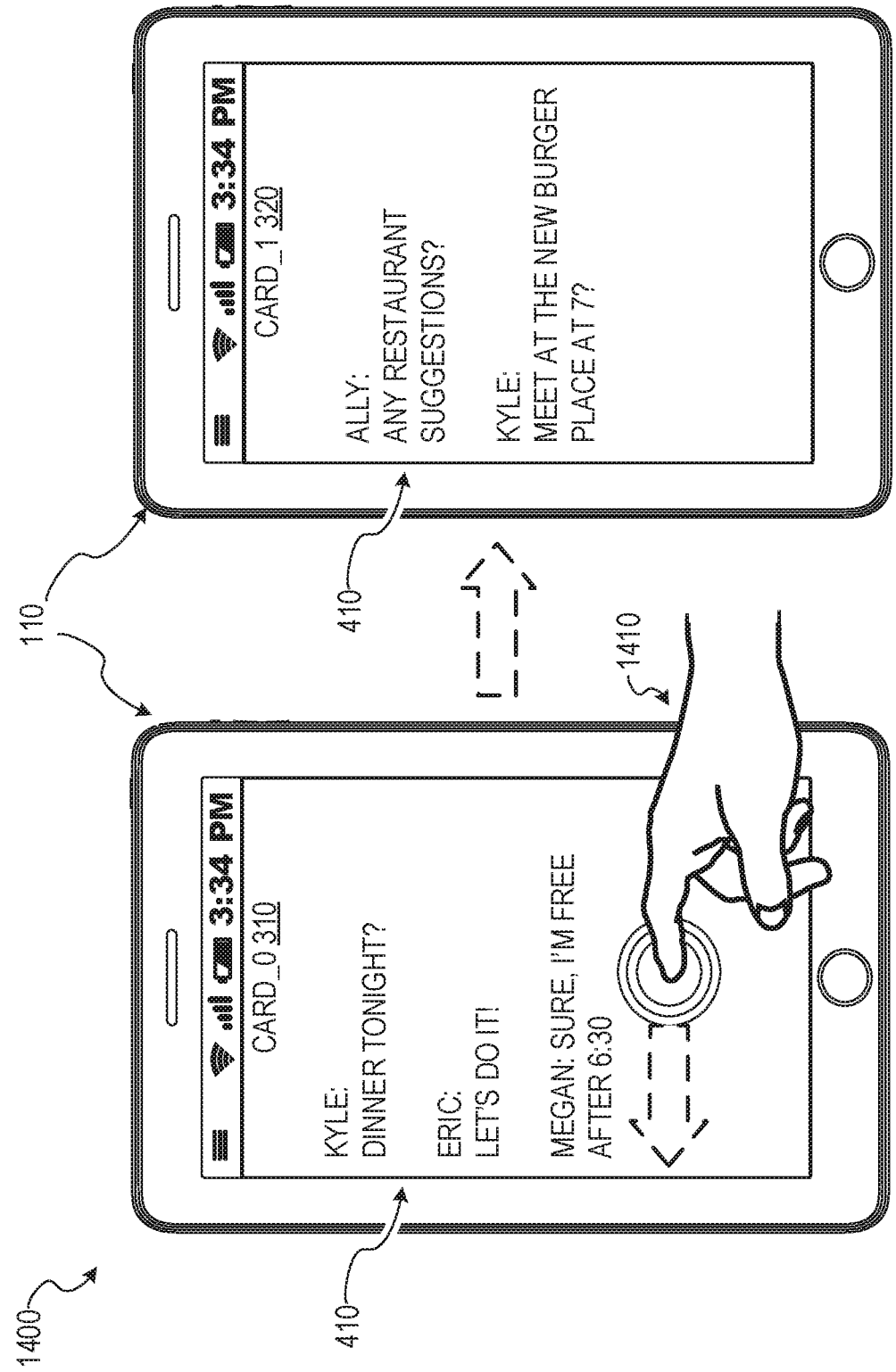
FIG. 14 is a user interface diagram depicting the display of two overlaid cards, as well as the mechanism for navigating from one overlaid card to another overlaid card, according to some example embodiments.

Referring now to FIG. 14, an example user interface diagram 1400 depicting the display of two overlaid cards is shown. On the left of FIG. 14, CARD_0 310, containing three messages, is displayed on the device interface 410 of client device 110. In response to a user input 1410, the simplified viewing system 160 transitions from displaying CARD_0 310 to CARD_1 320 on the interface 410 of client device 110. The user input 1410 is a horizontal swiping motion in some embodiments. In other embodiments, user input 1410 can include a vertical swiping motion, a tapping motion, a double-tapping motion, a diagonal swiping motion, a press of a button, or other user inputs received through client device 110. In various embodiments, the transition from one media card to another (e.g., from CARD_0 310 to CARD_1 320) is accompanied by an animation. In some embodiments, the overlaid cards will automatically transition from one card to the next card (e.g., from CARD_0 310 to CARD_1 320) after a certain amount of time, even without receiving a user input via the interface 410 of client device 110.

Figure 15:
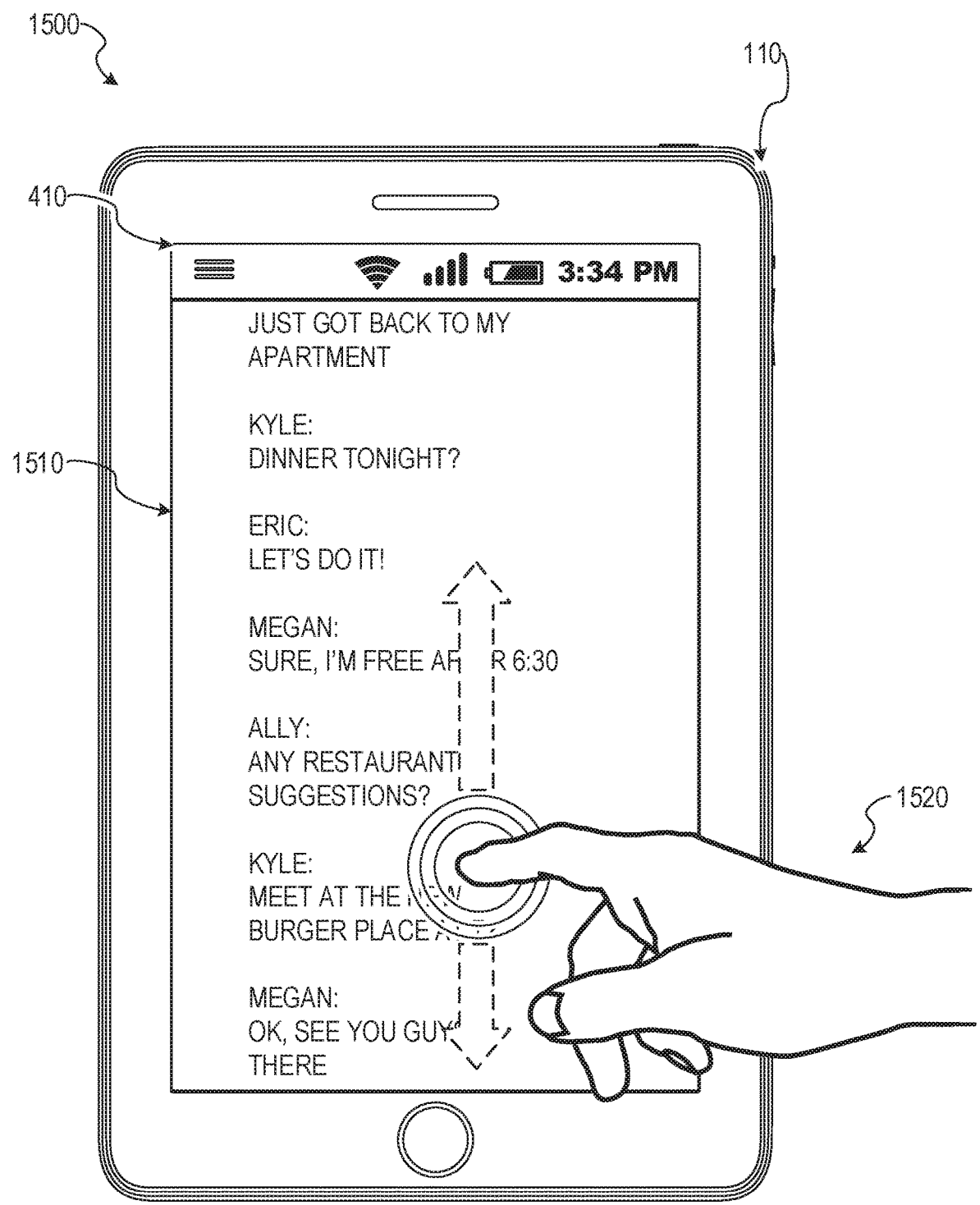
FIG. 15 is an illustrative diagram depicting an example alternative message view (for example, an alternative view that is displayed after all overlaid cards have already been displayed on the client device).

FIG. 15 is an illustrative diagram 1500 depicting an example alternative view, which is displayed after all overlaid cards have been displayed in various embodiments. For example, alternative view 1510 is displayed on the interface 410 of the client device 110, and displays all of the messages in the conversation without separating the message feed into message groups. In various embodiments, alternative view 1510 is responsive to a user input 1520 via the interface 410, where the user input 1520 allows the user to scroll through the entire contents of the conversation, or a certain most recent number of messages in the conversation. For example, a messaging application automatically loads the latest 50 messages within the alternative view 1510, and loads the previous 50 messages when the user scrolls to the top of the message feed. Alternative view 1510 contains more messages than the overlaid cards displayed by the simplified viewing system, thereby requiring a user to scroll through a large number of messages in a conversation and find the last message that the user viewed manually.

Figure 16:
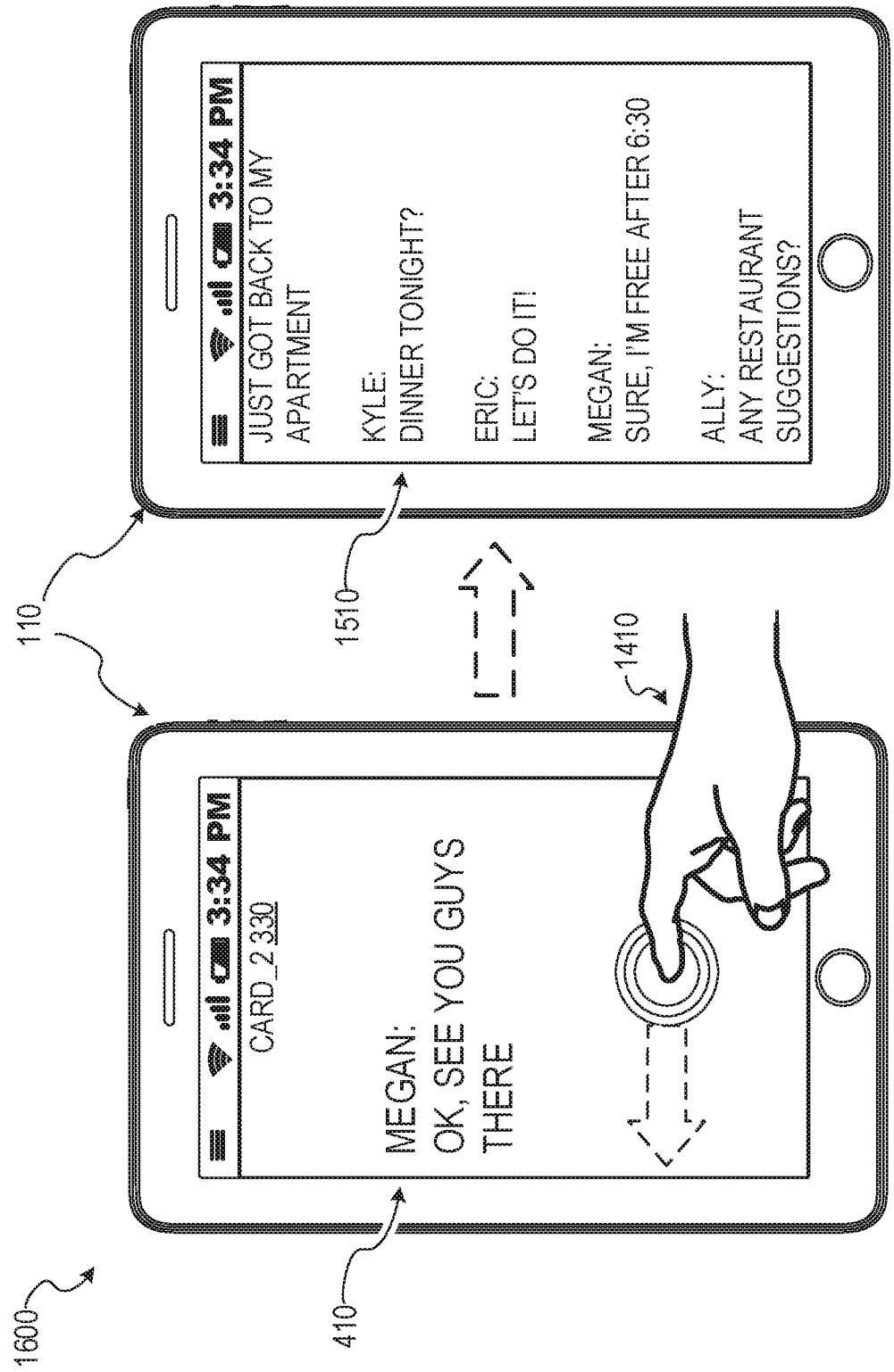
FIG. 16 is a user interface diagram depicting an example mechanism by which the simplified viewing system switches display from an overlaid card to the alternative view.

Referring now to FIG. 16, an illustrative diagram 1600 depicting an example mechanism by which the simplified viewing system switches display from an overlaid card to the alternative view 1510 is shown. In example embodiments, when the last card in a series of overlaid cards (e.g., CARD_2 330) is displayed, a user input 1410 will then cause the user device 110 to display the alternative view 1510 instead of the overlaid cards on the interface 410 of user device 110. In various embodiments, a set of overlaid cards, which includes all generated overlaid cards, are placed into a display order. The set of overlaid cards is transitioned through, in the display order, until the overlaid card which is last in the display order is displayed. Once the last overlaid card has been displayed, in example embodiments, the alternative view 1510 (e.g., a different arrangement of the messages) is displayed. In such embodiments, the simplified viewing system 160 does not completely replace the alternative view 1510. Instead, it simply allows the user to preview the portions of the conversation which the user has not yet seen, by swiping through a series of overlaid cards depicting the unread messages in easily readable message groups. In order to further increase readability using the simplified viewing system 160, the font size displayed is a greater point size when viewing an overlaid card (e.g., CARD_2 330) than when viewing the alternative view 1510 in various embodiments.

Figure 17:
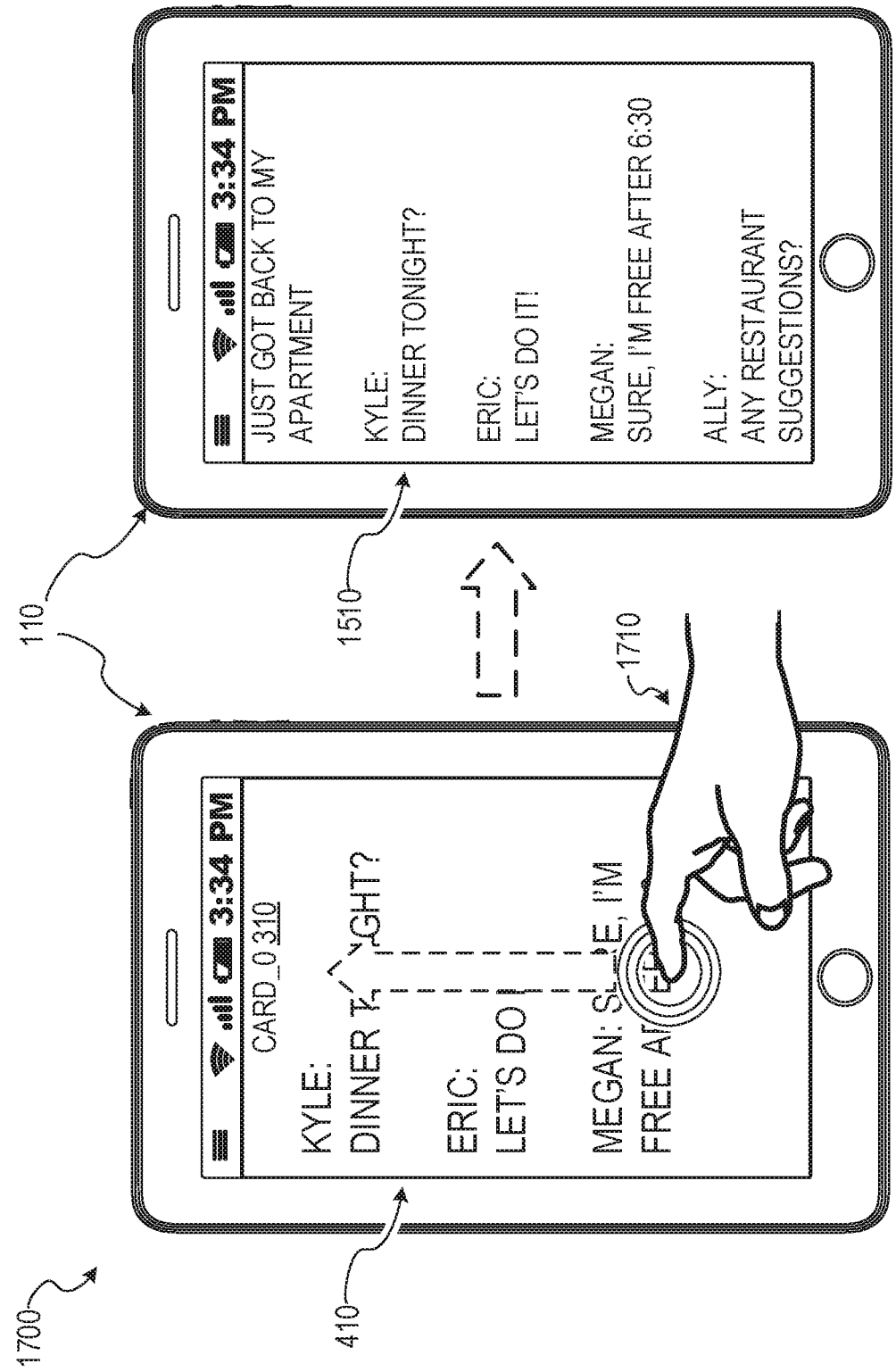
FIG. 17 is a user interface diagram depicting the effect of various user inputs on the overlaid card, according to some example embodiments.

FIG. 17 is a user interface diagram 1700 depicting the effect of various user inputs on the overlaid card. FIGS. 3 and 16 depicted user inputs 1410 which allow for navigation from one overlaid card to another, or from the last overlaid card in the sequence to the alternative view 1510 (e.g., a scrolling view depicting all messages within the conversation). In FIG. 17, a user input 1710 is depicted as interacting with the interface 410 of client device 110, while the client device 110 is displaying CARD_0 310, which is an overlaid card depicting three messages within a conversation. In response to receiving the user input 1710, the simplified viewing system navigates to the alternative view 1510 even if the overlaid card being displayed is not the last overlaid card in the series. In other example embodiments, various user inputs allow the user to interact with the overlaid cards in other ways as well. User inputs include a tapping gesture, double-tapping gesture, horizontal, vertical or diagonal swiping gesture, a pinching gesture, a zooming gesture, and multi-finger touch. Depending on the embodiment, certain user inputs can allow a user to respond directly to the messages in the overlaid card, take a screenshot of the overlaid card, interact with messages or users in the overlaid card, and the like. For example, a user double-taps the overlaid card and the font size of the messages on the overlaid card changes in response to the user input. In another example, a user double-taps the overlaid card and an image depicting the overlaid card is saved to the user device 110. In yet another example, a "press and hold" gesture (e.g., pressing and holding for at least a threshold time period such as one second, 30 seconds, one minute, 10 minutes, or any other such threshold) saves any chat media to the client device 110. In various embodiments, actions taken by the simplified viewing system 160 in response to user inputs are accompanied by animations.

Figure 18:
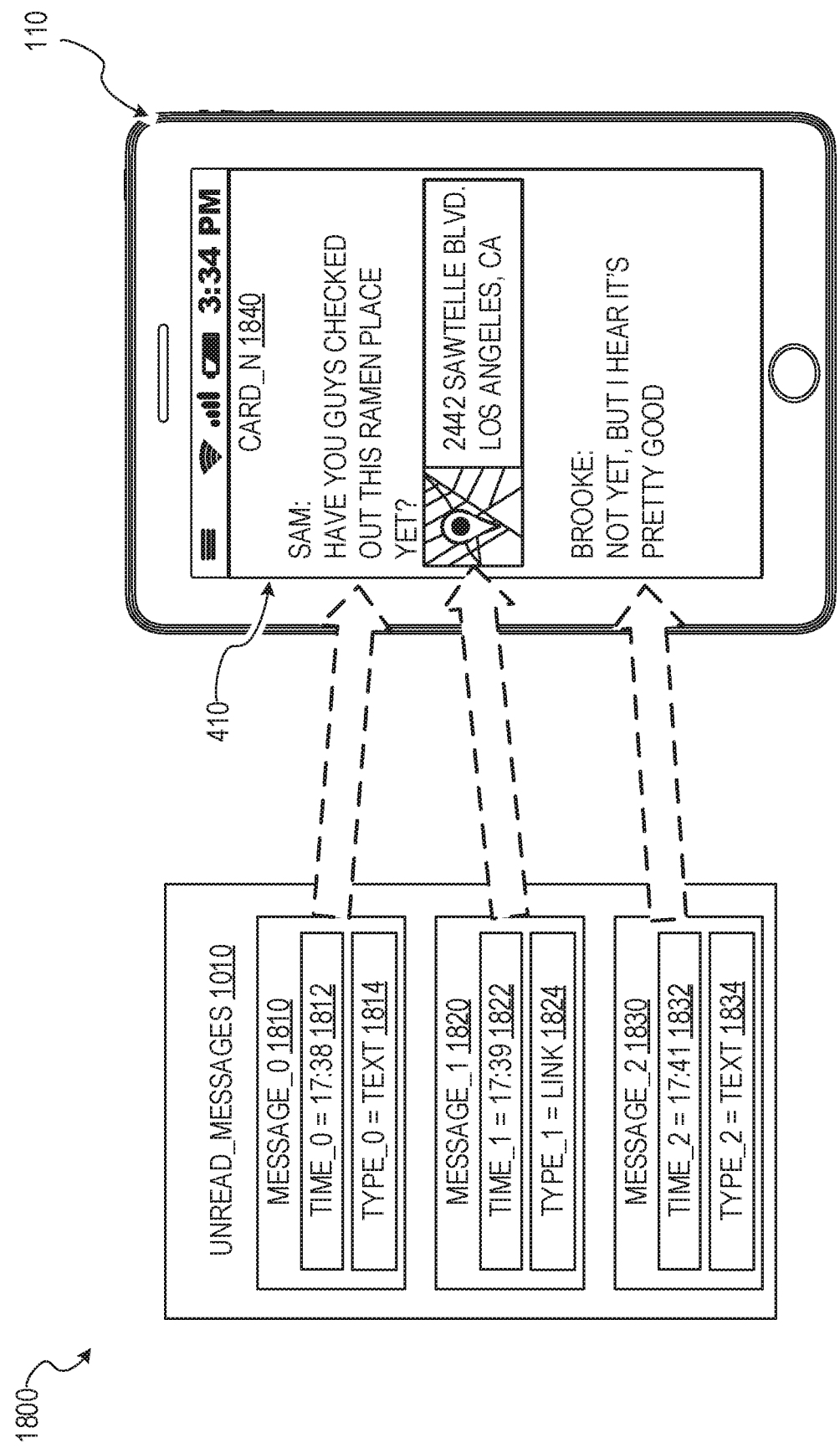
FIG. 18 is a user interface diagram which depicts the media previewing functionality for messages containing media, according to some example embodiments.

FIG. 18 is a user interface diagram 1800 which depicts the media previewing functionality granted by the media preview module 260. The list of unread messages 1010, as first described in FIG. 10, contains three messages in the example user interface diagram 1800. Each message has a timestamp and an associated message type. For example, message types include links, text, images, videos, audio, and GPS coordinates. MESSAGE_0 1810 has the attributes TIME_0 1812 and TYPE_0 1814, which correspond to a timestamp of 17:38 and a message type denoting a text message. MESSAGE_1 1820 has the attributes TIME_1 1822 and TYPE_1 1824, which correspond to a timestamp of 17:39 and a message type denoting a link. For example, the sending user includes text which the simplified viewing system 160 identifies as a URL. MESSAGE_2 1830 has the attributes TIME_2 1832 and TYPE_2 1834, which correspond to a timestamp of 17:41 and a message type denoting a text message. Since MESSAGE_1 1820 is identified as a link, the media preview module 260 generates a preview of the linked content, and displays the preview on the overlaid card CARD_N 1840. In various embodiments, this preview is a miniature preview, which is embedded into the first overlaid card containing the first set of messages. For example, a user sends a URL corresponding to a restaurant location on a map, found through a map application (e.g., GOOGLE MAPS® or APPLE MAPS®), and the media preview module 260 displays a preview of the map data in line with other messages on the interface 410 of client device 110. In various embodiments, the preview generated by the media preview module 260 is selectable and redirects the user to the site or the application hosting the linked content. In various embodiments, a miniature preview of the media message is generated when the media is accompanied by text messages having timestamps within a threshold time period of the media message's timestamp.

Figure 19:
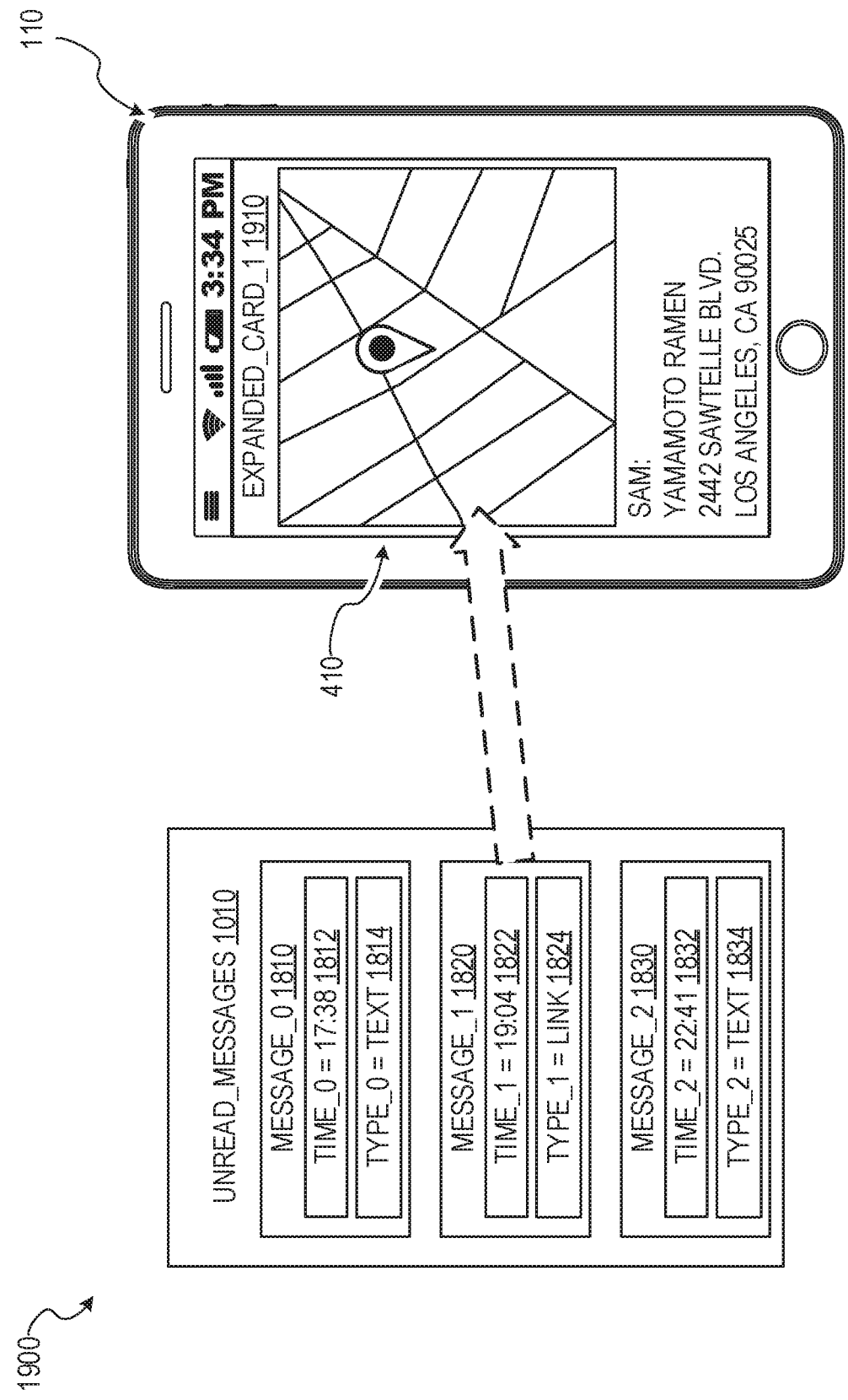
FIG. 19 is another example user interface diagram depicting a media preview generated when a media message is received within a conversation, according to some example embodiments.

FIG. 19 is another user interface diagram 1900 depicting a preview of media sent within a conversation. As described in FIG. 18, the list of unread messages 1010 contains three messages in the example interface diagram 1900. Each message has a timestamp and an associated message type. MESSAGE_0 1810 has the attributes TIME_0 1812 and TYPE_0 1814, which correspond to a timestamp of 17:38 and a message type denoting a text message. MESSAGE_1 1820 has the attributes TIME_1 1822 and TYPE_1 1824, which correspond to a timestamp of 19:04 and a message type denoting a link. MESSAGE_2 1830 has the attributes TIME_2 1832 and TYPE_2 1834, which correspond to a timestamp of 19:04 and a message type denoting a link. Unlike in FIG. 18 where the media preview module 260 generates a preview of the linked content for display in line with other messages, media preview module 260 generates an expanded media card predominantly displaying the linked media in FIG. 19. For example, media preview module 260 generates EXPANDED_CARD_1 1910 depicting an enlarged view of map data for a restaurant, the restaurant name, and the restaurant address displayed on the interface 410 of client device 110. In various embodiments, the EXPANDED_CARD_1 1910 is a selectable link leading to the previewed content. The aggregation module 230 contains logic to determine whether the media preview should be displayed on an enlarged card predominantly featuring the media content, or whether the preview should be displayed in line with other messages within an overlaid card. In some embodiments, the media preview is displayed on its own if the messages with timestamps before and after the media preview are from senders other than the user sending the media message. In other embodiments, the media preview is displayed on its own if there are no messages received within a threshold amount of time (e.g., when the difference in timestamp of the media message is at least 1 minute from all other messages in the conversation). In some embodiments, the media preview is always embedded along with other messages, while in some embodiments the media preview is always displayed in an enlarged card such as EXPANDED_CARD_1 1910.

Figure 20:
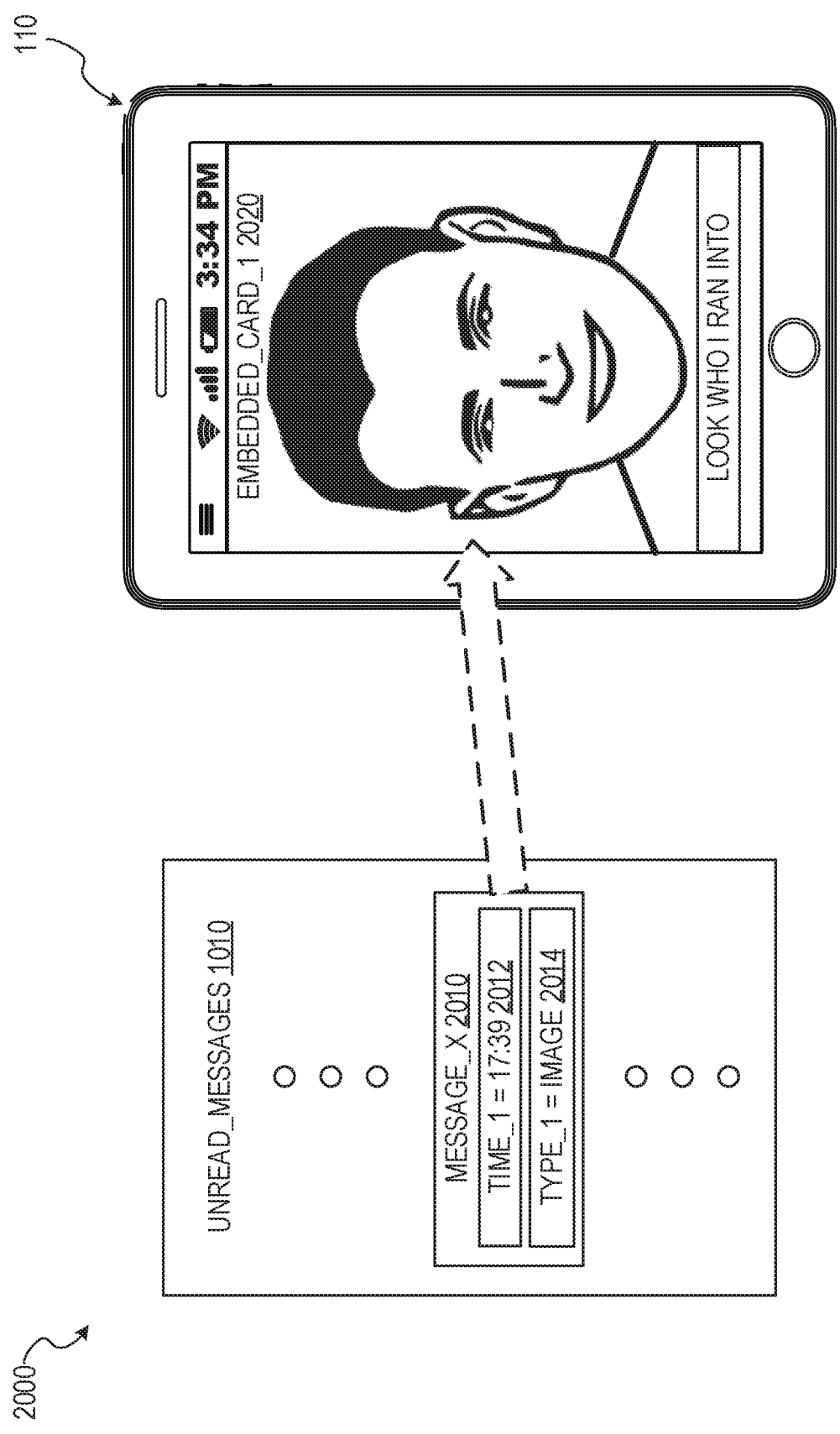
FIG. 20 is an example interface diagram depicting a fullscreen image view when images are sent in the same group conversation as other types of messages, according to some example embodiments.

Referring now to FIG. 20, an example user interface diagram 2000 depicts the capability to display images within the simplified viewing system 160. A list of unread messages 1010 contains an image message: MESSAGE_X 2010, which has an associated message timestamp TIME_1 2012 of 17:39 and an associated message type TYPE_1 2014 denoting that the message is an image. For example, MES- SAGE_X 2010 is an image generated from within the SNAPCHAT® application, and can be edited with various image filters, text overlays, and geotags. Upon determining that MESSAGE_X 2010 is an image, the arrangement module 240 generates a fullscreen depiction of the image EMBEDDED_CARD_1 2020 to display on interface 410 of client device 110. For instance, the fullscreen depiction of the image is placed into the series of overlaid cards based on the timestamp TIME_1 2012 of the image compared to the timestamp of messages within the overlaid cards. In various embodiments, all messages which are image messages (e.g., with TYPE_1=IMAGE 2014) are displayed as fullscreen cards before all other overlaid cards, or after all other overlaid cards are displayed. In yet other embodiments, image messages are embedded in overlaid cards along with other messages. Some embodiments of an overlaid card as referred to herein refer both to an overlaid card representation output on a display of a device, and to the data structures in memory of a device that are generated using instructions processed by processor implemented modules to generate and process the data in the data structures and to output the information for the overlaid card to an output display.

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. For example, the data module 210 as described in FIG. 2 is communicatively coupled to the presentation module 250. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations. For example, the presentation module 250 is located within a client device while the data module 220 is located within a server farm in some embodiments.

The modules, methods, applications and so forth described in conjunction with FIGS. 1-22 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." Yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 21:
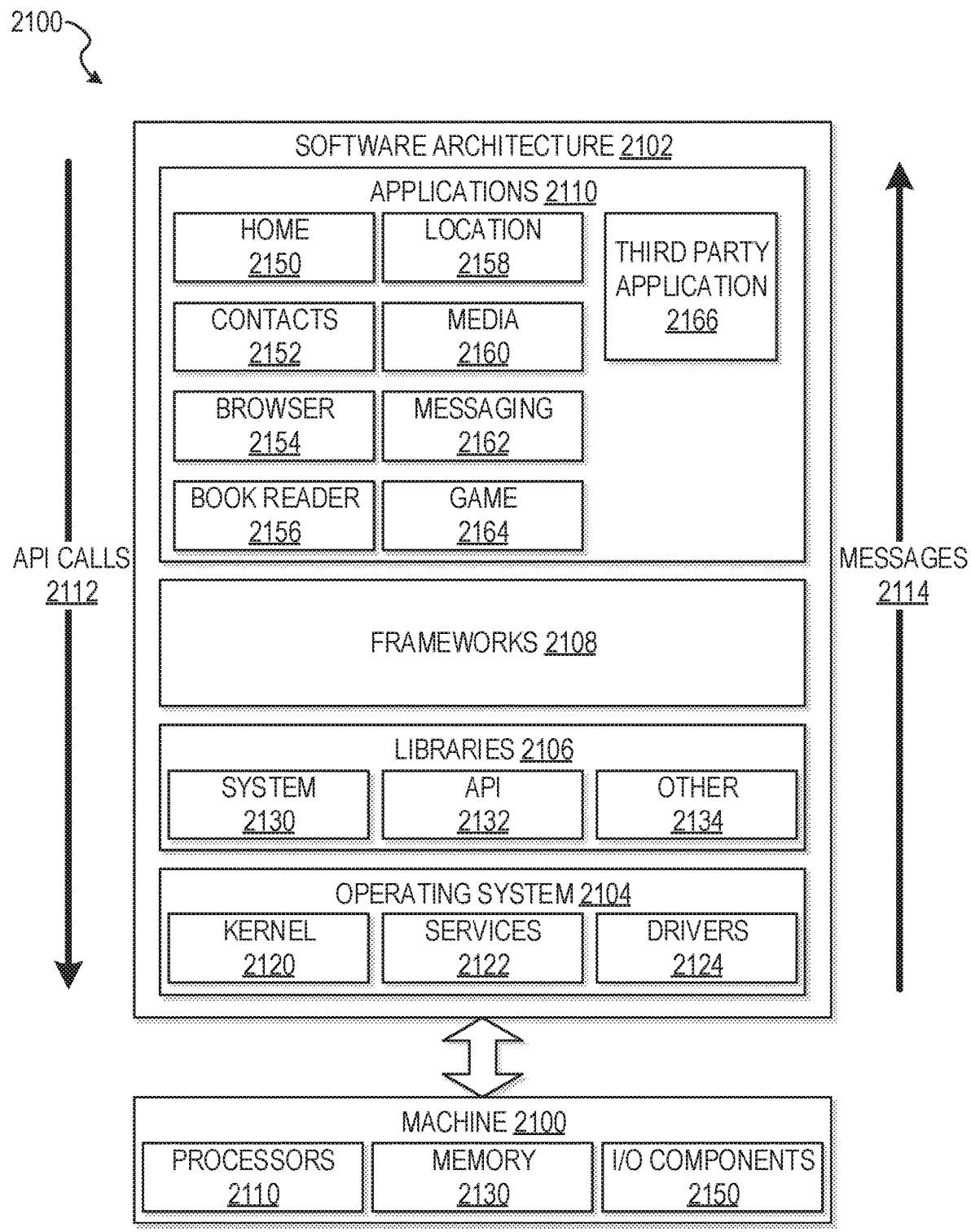
FIG. 21 is a block diagram illustrating an example of a software architecture that may be installed on a machine, according to some example embodiments.

FIG. 21 is a block diagram 2100 illustrating an architecture of software 2102, which can be installed on any one or more of the devices described above. FIG. 21 is merely a non-limiting example of a software architecture, and it will be appreciated that many other architectures can be implemented to facilitate the functionality described herein. In various embodiments, the software 2102 is implemented by hardware such as a machine 2200 of FIG. 22 that includes processors 2210, memory 2230, and I/O components 2250. In this example architecture, the software 2102 can be conceptualized as a stack of layers where each layer may provide a particular functionality. For example, the software 2102 includes layers such as an operating system 2104, libraries 2106, frameworks 2108, and applications 2110. Operationally, the applications 2110 invoke API calls 2112 through the software stack and receive messages 2114 in response to the API calls 2112, consistent with some embodiments.

In various implementations, the operating system 2104 manages hardware resources and provides common services. The operating system 2104 includes, for example, a kernel 2120, services 2122, and drivers 2124. The kernel 2120 acts as an abstraction layer between the hardware and the other software layers consistent with some embodiments. For example, the kernel 2120 provides memory management, processor management (e.g., scheduling), component management, networking, and security settings, among other functionality. The services 2122 can provide other common services for the other software layers. The drivers 2124 are responsible for controlling or interfacing with the underlying hardware, according to some embodiments. For instance, the drivers 2124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 2106 provide a low-level common infrastructure utilized by the applications 2110. The libraries 2106 can include system libraries 2130 (e.g., C standard library) that can provide functions such as memory allocation functions, string manipulation functions, mathematic functions, and the like. In addition, the libraries 2106 can include API libraries 2132 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 2106 can also include a wide variety of other libraries 2134 to provide many other APIs to the applications 2110.

The frameworks 2108 provide a high-level common infrastructure that can be utilized by the applications 2110, according to some embodiments. For example, the frameworks 2108 provide various graphic user interface (GUI) functions, high-level resource management, high-level location services, and so forth. The frameworks 2108 can provide a broad spectrum of other APIs that can be utilized by the applications 2110, some of which may be specific to a particular operating system or platform.

In an example embodiment, the applications 2110 include a home application 2150, a contacts application 2152, a browser application 2154, a book reader application 2156, a location application 2158, a media application 2160, a messaging application 2162, a game application 2164, and a broad assortment of other applications such as a third party application 2166. According to some embodiments, the applications 2110 are programs that execute functions defined in the programs. Various programming languages can be employed to create one or more of the applications 2110, structured in a variety of manners, such as object-oriented programming languages (e.g., Objective-C, Java, or C++) or procedural programming languages (e.g., C or assembly language). In a specific example, the third party application 2166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 2166 can invoke the API calls 2112 provided by the operating system 2104 to facilitate functionality described herein.

Figure 22:
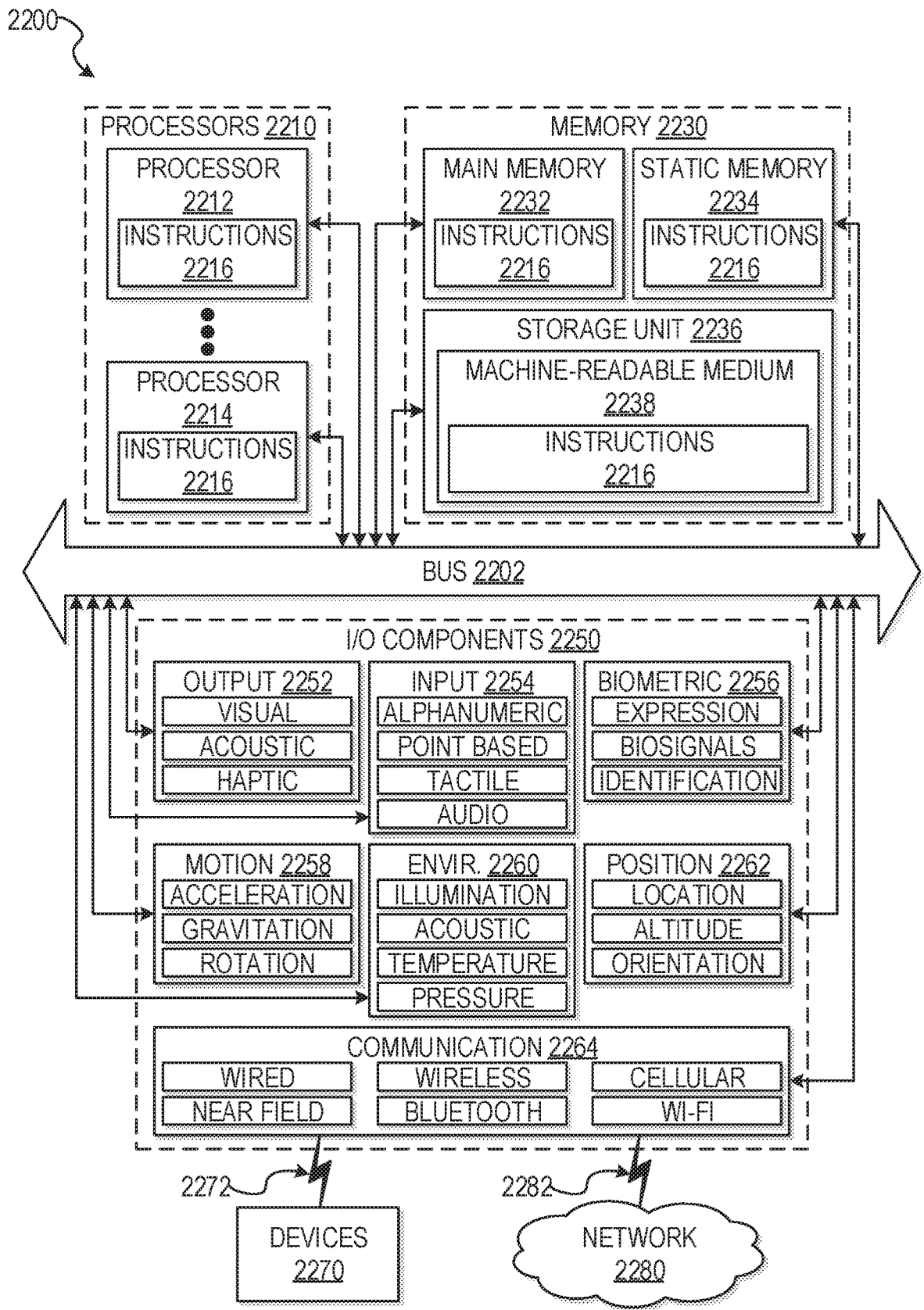
FIG. 22 is a block diagram presenting a diagrammatic representation of a machine in the form of a computer system within which a set of instructions may be executed for causing the machine to perform any of the methodologies discussed herein, according to an example embodiment.

FIG. 22 is a block diagram illustrating components of a machine 2200, according to some embodiments, able to read instructions from a machine-readable medium (e.g., a machine-readable storage medium) and perform any one or more of the methodologies discussed herein. Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein can be executed. In alternative embodiments, the machine 2200 operates as a standalone device or can be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

In various embodiments, the machine 2200 comprises processors 2210, memory 2230, and I/O components 2250, which can be configured to communicate with each other via a bus 2202. In an example embodiment, the processors 2210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 2212 and a processor 2214 that may execute the instructions 2216. The term "processor" is intended to include multi-core processors that may comprise two or more independent processors (also referred to as "cores") that can execute instructions contemporaneously. Although FIG. 22 shows multiple processors, the machine 2200 may include a single processor with a single core, a single processor with multiple cores (e.g., a multi-core processor), multiple processors with a single core, multiple processors with multiples cores, or any combination thereof.

The memory 2230 comprises a main memory 2232, a static memory 2234, and a storage unit 2236 accessible to the processors 2210 via the bus 2202, according to some embodiments. The storage unit 2236 can include a machine-readable medium 2238 on which are stored the instructions 2216 embodying any one or more of the methodologies or functions described herein. The instructions 2216 can also reside, completely or at least partially, within the main memory 2232, within the static memory 2234, within at least one of the processors 2210 (e.g., within the processor's cache memory), or any suitable combination thereof, during execution thereof by the machine 2200. Accordingly, in various embodiments, the main memory 2232, the static memory 2234, and the processors 2210 are considered machine-readable media 2238.

As used herein, the term "memory" refers to a machine-readable medium 2238 able to store data temporarily or permanently and may be taken to include, but not be limited to, random-access memory (RAM), read-only memory (ROM), buffer memory, flash memory, and cache memory. While the machine-readable medium 2238 is shown in an example embodiment to be a single medium, the term "machine-readable medium" should be taken to include a single medium or multiple media (e.g., a centralized or distributed database, or associated caches and servers) able to store the instructions 2216. The term "machine-readable medium" shall also be taken to include any medium, or combination of multiple media, that is capable of storing instructions (e.g., instructions 2216) for execution by a machine (e.g., machine 2200), such that the instructions, when executed by one or more processors of the machine 2200 (e.g., processors 2210), cause the machine 2200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 2250 include a wide variety of components to receive input, provide output, produce output, transmit information, exchange information, capture measurements, and so on. In general, it will be appreciated that the I/O components 2250 can include many other components that are not shown in FIG. 22. The I/O components 2250 are grouped according to functionality merely for simplifying the following discussion, and the grouping is in no way limiting. In various example embodiments, the I/O components 2250 include output components 2252 and input components 2254. The output components 2252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2250 include biometric components 2256, motion components 2258, environmental components 2260, or position components 2262, among a wide array of other components. For example, the biometric components 2256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2258 include acceleration sensor components (e.g., an accelerometer), gravitation sensor components, rotation sensor components (e.g., a gyroscope), and so forth. The environmental components 2260 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2262 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 include a network interface component or another suitable device to interface with the network 2280. In further examples, communication components 2264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2270 may be another machine or any of a wide variety of peripheral devices (e.g., a peripheral device coupled via a USB).

Moreover, in some embodiments, the communication components 2264 detect identifiers or include components operable to detect identifiers. For example, the communication components 2264 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2264, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 2280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2280 or a portion of the network 2280 may include a wireless or cellular network, and the coupling 2282 may be a Code Division Multiple Access (CDMA) connection, a Global System for Mobile communications (GSM) connection, or another type of cellular or wireless coupling. In this example, the coupling 2282 can implement any of a variety of types of data transfer technology, such as Single Carrier Radio Transmission Technology (1×RTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA). Worldwide Interoperability for Microwave Access (WiMAX), Long Term Evolution (LTE) standard, others defined by various standard-setting organizations, other long range protocols, or other data transfer technology.

In example embodiments, the instructions 2216 are transmitted or received over the network 2280 using a transmission medium via a network interface device (e.g., a network interface component included in the communication components 2264) and utilizing any one of a number of well-known transfer protocols (e.g., HTTP). Similarly, in other example embodiments, the instructions 2216 are transmitted or received using a transmission medium via the coupling 2272 (e.g., a peer-to-peer coupling) to the devices 2270. The term "transmission medium" shall be taken to include any intangible medium that is capable of storing, encoding, or carrying the instructions 2216 for execution by the machine 2200, and includes digital or analog communications signals or other intangible media to facilitate communication of such software.

Furthermore, the machine-readable medium 2238 is non-transitory (in other words, not having any transitory signals) in that it does not embody a propagating signal. However, labeling the machine-readable medium 2238 "non-transitory" should not be construed to mean that the medium is incapable of movement; the medium should be considered as being transportable from one physical location to another. Additionally, since the machine-readable medium 2238 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method, comprising:
receiving, at a first client device comprising one or more hardware processors and a memory, a first plurality of messages, the plurality of messages being grouped within a conversation into two or more groups, each of the messages in each group meeting a respective group criterion;
generating a first overlaid card by arranging a first message group of a first of the two or more groups on the first overlaid card, the first message group arranged within the first overlaid card based on a criterion;
generating a second overlaid card by arranging a second message group of a second of the two or more groups on the second overlaid card, the second message group arranged within the second overlaid card based on the criterion;
determining a first font size for an arrangement of a second plurality of messages;
determining a second font size for the first and second message groups arranged in the first and second overlaid cards, wherein the second font size has a greater point size than the first font size;
receiving a user input to transition from displaying the first overlaid card to displaying the second overlaid card; and
in response to the user input to transition from displaying the first overlaid card to displaying the second overlaid card, displaying an animation while transitioning from displaying the first overlaid card to displaying the second overlaid card, the first overlaid card and the second overlaid card configured to exclusively display respectively the first and second message groups within the conversation.

2. The method of claim 1, further comprising:
ordering the overlaid cards;
displaying the overlaid cards according to the order until the overlaid card last in the order is displayed; and
displaying the arrangement of the second plurality of messages.

3. The method of claim 1, further comprising:
ordering the overlaid cards;
displaying the overlaid cards according to the order;
detecting a second user input; and
displaying the arrangement of the second plurality of messages in response to detecting the second user input.

4. The method of claim 1, wherein the first plurality of messages are ordered by timestamp within each message group.

5. The method of claim 1, wherein the first plurality of messages is grouped such that passage of a predetermined threshold amount of time between the sending of two messages causes the two messages to be displayed on different overlaid cards.

6. The method of claim 1, further comprising:
receiving an image within the conversation;
displaying a plurality of overlaid cards with messages received earlier than the image; and
displaying the image in a full screen view in response to completion of the display of the plurality of overlaid cards.

7. The method of claim 1, further comprising:
detecting a media message sent by a user, wherein the media is accompanied by text messages which have timestamps within a threshold time period of the media message;
embedding a miniature preview of the media message into the first overlaid card; and
displaying the miniature preview of the media message on the first overlaid card in line with text messages displayed on the first media card.

8. The method of claim 1, further comprising:
detecting a media message sent by a user, wherein the media is not accompanied by text messages which have timestamps within a threshold time period of the media message;
embedding an enlarged preview of the media message into a full screen media card; and
displaying the full screen media card separately from the first and second overlaid cards.

9. The method of claim 8, further comprising displaying a selectable link to the media previewed, wherein the selectable link is displayed within the full screen media card.

10. The method of claim 1, further comprising:
determining a message within the first plurality of messages that is marked as read, and has a latest timestamp as other messages marked as read; and
displaying the message with the latest timestamp within the first overlaid card.

11. A non-transitory machine-readable medium storing instructions that, when executed by at least one processor of a machine, cause the machine to perform operations comprising:
receiving a first plurality of messages within a conversation;
grouping the first plurality of messages into two or more groups, each of the messages in each group meeting a respective group criteria;
generating a first overlaid card by arranging a first message group of a first of the two or more groups on the first overlaid card, the first message group arranged within the first overlaid card based on a criterion;
generating a second overlaid card by arranging a second message group of a second of the two or more groups on the second overlaid card, the second message group arranged within the second overlaid card based on the criterion;
determining a first font size for an arrangement of a second plurality of messages;
determining a second font size for the first and second message groups arranged in the first and second overlaid cards, wherein the second font size has a greater point size than the first font size;
receiving a user input to transition from displaying the first overlaid card to displaying the second overlaid card; and
in response to the user input to transition from displaying the first overlaid card to displaying the second overlaid card, displaying an animation while transitioning from displaying the first overlaid card to displaying the second overlaid card, the first overlaid card and the second overlaid card configured to exclusively display respectively the first and second message groups within the conversation.

12. The non-transitory machine-readable medium of claim 11, the operations further comprising:
ordering the overlaid cards;
displaying the overlaid cards according to the order until the overlaid card last in the order is displayed; and
displaying the arrangement of the second plurality of messages.

13. The non-transitory machine-readable medium storing of claim 11, the operations further comprising:
ordering the overlaid cards;
displaying the overlaid cards according to the order;
detecting a second user input; and
displaying the arrangement of the second plurality of messages in response to detecting the second user input.

14. A system, comprising:
one or more hardware processors;
an electronic memory, electronically coupled to the one or more hardware processors, and storing instructions that when executed by the one or more hardware processors, configure the one or more hardware processors to perform operations comprising:
receiving a first plurality of messages within a conversation;
grouping the plurality of messages into two or more groups, each of the messages in each group meeting a respective group criteria;
generating a first overlaid card by arranging a first message group of a first of the two or more groups on the first overlaid card, the first message group arranged within the first overlaid card based on a criterion;
generating a second overlaid card by arranging a second message group of a second of the two or more groups on the second overlaid card, the second message group arranged within the second overlaid card based on the criterion;
determining a first font size for an arrangement of a second plurality of messages;
determining a second font size for the first and second message groups arranged in the first and second overlaid cards, wherein the second font size has a greater point size than the first font size;
receiving a user input to transition from displaying the first overlaid card to displaying the second overlaid card; and
in response to the user input to transition from displaying the first overlaid card to displaying the second overlaid card, displaying an animation while transitioning from displaying the first overlaid card to displaying the second overlaid card, the first overlaid card and the second overlaid card configured to exclusively display respectively the first message group and second message group within the conversation.

15. The system of claim 14, the operations further comprising:
ordering a set of overlaid cards;
displaying the set of overlaid cards according to the order until the overlaid card last in the order is displayed; and
displaying the arrangement of the second plurality of messages.

16. The system of claim 14, the operations further comprising:
ordering a set of overlaid cards;
displaying the set of overlaid cards according to the order;
detecting a second user input; and
displaying the arrangement of the second plurality of messages in response to detecting the second user input.

17. The system of claim 14, the operations further comprising: ordering the first plurality of messages by timestamp within each message group.

* * * * *